US012355163B2

(12) United States Patent
Wu et al.

(10) Patent No.: US 12,355,163 B2
(45) Date of Patent: Jul. 8, 2025

(54) ELECTRONIC DEVICE WITH MULTIPLE ANTENNA MODES

(71) Applicant: HUAWEI TECHNOLOGIES CO., LTD., Guangdong (CN)

(72) Inventors: Pengfei Wu, Shanghai (CN); Hanyang Wang, Reading (GB); Kun Feng, Shanghai (CN); Dong Yu, Shanghai (CN); Meng Hou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 291 days.

(21) Appl. No.: 17/802,900

(22) PCT Filed: Jan. 25, 2021

(86) PCT No.: PCT/CN2021/073626

§ 371 (c)(1),
(2) Date: Aug. 26, 2022

(87) PCT Pub. No.: WO2021/169700

PCT Pub. Date: Sep. 2, 2021

(65) Prior Publication Data

US 2023/0146114 A1 May 11, 2023

(30) Foreign Application Priority Data

Feb. 29, 2020 (CN) ......................... 202010132991.4

(51) Int. Cl.
*H01Q 5/40* (2015.01)
*H01Q 1/24* (2006.01)
(Continued)

(52) U.S. Cl.
CPC ............... *H01Q 5/40* (2015.01); *H01Q 1/243* (2013.01); *H01Q 5/10* (2015.01); *H01Q 5/307* (2015.01);
(Continued)

(58) Field of Classification Search
CPC ............ H01Q 5/40; H01Q 1/243; H01Q 5/10; H01Q 5/307; H01Q 5/35; H01Q 13/106;
(Continued)

(56) References Cited

U.S. PATENT DOCUMENTS 8,164,537 B2 * 4/2012 Kinezos ................ H01Q 1/243 343/702
8,686,918 B1 4/2014 Diaz
(Continued)

FOREIGN PATENT DOCUMENTS

AU 2018426062 A1 1/2020
CN 105742812 A 7/2016
(Continued)

OTHER PUBLICATIONS

Geng Yanfeng, Design of Diffirential Dual-Fequency Filting-Antenna, Aug. 2017 ,6 pages.

*Primary Examiner* — Hai V Tran
(74) *Attorney, Agent, or Firm* — WOMBLE BOND DICKINSON (US) LLP

(57) ABSTRACT

An antenna structure including a slot antenna and a wire antenna is disposed, and the antenna structure is excited to generate four antenna modes: a common mode slot antenna, a differential mode slot antenna, a common mode wire antenna, and a differential mode wire antenna in a symmetric feed manner and an anti-symmetric feed manner.

17 Claims, 26 Drawing Sheets

(51) Int. Cl.
*H01Q 5/10* (2015.01)
*H01Q 5/307* (2015.01)
*H01Q 5/35* (2015.01)
*H01Q 7/00* (2006.01)
*H01Q 9/42* (2006.01)
*H01Q 13/10* (2006.01)

(52) U.S. Cl.
CPC ................. *H01Q 5/35* (2015.01); *H01Q 7/00* (2013.01); *H01Q 9/42* (2013.01); *H01Q 13/10* (2013.01); *H01Q 13/106* (2013.01)

(58) Field of Classification Search
CPC ............ H01Q 7/00; H01Q 9/285; H01Q 9/42; H01Q 13/10; H01Q 1/244; H01Q 1/36; H01Q 1/50
See application file for complete search history.

(56) References Cited

U.S. PATENT DOCUMENTS

| | | | | |
|---|---|---|---|---|
| 10,158,384 | B1 | 12/2018 | Yarga et al. | |
| 10,193,597 | B1 * | 1/2019 | Garrido Lopez | H04B 5/26 |
| 10,396,438 | B1 * | 8/2019 | Smith | H01Q 1/2283 |
| 10,886,607 | B2 * | 1/2021 | Ayala Vazquez | H01Q 1/42 |
| 10,992,045 | B2 * | 4/2021 | Patton | H01Q 9/26 |
| 10,992,047 | B2 * | 4/2021 | Patton | H01Q 9/26 |
| 11,515,648 | B2 * | 11/2022 | Liao | H01Q 1/2283 |
| 2004/0090373 | A1 | 5/2004 | Faraone et al. | |
| 2007/0085747 | A1 * | 4/2007 | DiNallo | H01Q 5/357 343/702 |
| 2008/0316117 | A1 | 12/2008 | Hill et al. | |
| 2009/0128439 | A1 * | 5/2009 | Su | H01Q 9/24 343/795 |
| 2010/0231461 | A1 * | 9/2010 | Tran | H01Q 1/20 343/702 |
| 2010/0283688 | A1 | 11/2010 | Kinezos et al. | |
| 2012/0194404 | A1 * | 8/2012 | Arkko | H01Q 5/364 343/867 |
| 2012/0229347 | A1 * | 9/2012 | Jin | H01Q 21/28 343/702 |
| 2012/0274536 | A1 * | 11/2012 | Pan | H01Q 21/28 343/853 |
| 2013/0057443 | A1 * | 3/2013 | Asanuma | H01Q 5/314 343/751 |
| 2013/0076579 | A1 * | 3/2013 | Zhang | H01Q 1/521 343/834 |
| 2014/0097991 | A1 | 4/2014 | Zheng et al. | |
| 2015/0109171 | A1 * | 4/2015 | Lin | H01Q 7/00 343/702 |
| 2015/0123871 | A1 * | 5/2015 | Chang | H01Q 5/371 343/872 |
| 2016/0111772 | A1 * | 4/2016 | Lilja | H01Q 1/243 343/702 |
| 2016/0141750 | A1 | 5/2016 | Lankes et al. | |
| 2016/0285169 | A1 * | 9/2016 | Shooshtari | H01Q 21/062 |
| 2017/0256843 | A1 * | 9/2017 | Hu | H01Q 21/28 |
| 2017/0264721 | A1 * | 9/2017 | Yli-Peltola | H01Q 5/328 |
| 2018/0062244 | A1 * | 3/2018 | Huang | H01Q 5/371 |
| 2018/0090850 | A1 | 3/2018 | Lee et al. | |
| 2018/0375208 | A1 * | 12/2018 | Lee | H01Q 5/50 |
| 2019/0074586 | A1 | 3/2019 | Ruaro et al. | |
| 2019/0097319 | A1 * | 3/2019 | Hsieh | H01Q 1/243 |
| 2019/0115653 | A1 | 4/2019 | Yun et al. | |
| 2019/0207297 | A1 * | 7/2019 | Gu | H01Q 9/145 |
| 2019/0214721 | A1 * | 7/2019 | Hu | H01Q 5/385 |
| 2019/0260112 | A1 * | 8/2019 | Azad | H01Q 9/42 |
| 2019/0372201 | A1 | 12/2019 | Zhu et al. | |
| 2019/0372215 | A1 * | 12/2019 | Lee | H01Q 5/378 |
| 2019/0372223 | A1 * | 12/2019 | Hsu | H01Q 1/241 |
| 2019/0393586 | A1 * | 12/2019 | Ayala Vazquez | H01Q 5/328 |
| 2020/0044311 | A1 * | 2/2020 | Gu | H01Q 21/28 |
| 2020/0044346 | A1 * | 2/2020 | Gu | H01Q 5/50 |
| 2020/0044364 | A1 * | 2/2020 | Zhu | H01Q 1/243 |
| 2020/0058984 | A1 * | 2/2020 | Qiu | H01Q 7/00 |
| 2020/0058993 | A1 * | 2/2020 | Qiu | H01Q 5/30 |
| 2020/0099125 | A1 * | 3/2020 | Ying | H01Q 5/378 |
| 2021/0075090 | A1 * | 3/2021 | Yarga | H01Q 1/241 |
| 2022/0385311 | A1 * | 12/2022 | Shin | H01Q 5/328 |

FOREIGN PATENT DOCUMENTS

| | | | | |
|---|---|---|---|---|
| CN | 106134002 | A | 11/2016 | |
| CN | 106450744 | A | 2/2017 | |
| CN | 107369891 | A | 11/2017 | |
| CN | 107394365 | A | 11/2017 | |
| CN | 107453056 | A | 12/2017 | |
| CN | 107483675 | A | 12/2017 | |
| CN | 108470979 | A | 8/2018 | |
| CN | 108713277 | A | 10/2018 | |
| CN | 112803158 | B * | 6/2022 | H01Q 1/243 |
| EP | 2410607 | A1 | 1/2012 | |
| WO | 2017090865 | A1 | 6/2017 | |

* cited by examiner

ELECTRONIC DEVICE WITH MULTIPLE ANTENNA MODES

This application is a National Stage of International Patent Application No. PCT/CN2021/073626, filed on Jan. 25, 2021, which claims priority to Chinese Patent Application No. 202010132991.4, filed on Feb. 29, 2020, both of which are hereby incorporated by reference in their entireties.

TECHNICAL FIELD

This application relates to the field of antenna technologies, and in particular, to an electronic device.

BACKGROUND

For electronic devices, especially mobile phone products, with rapid development of key technologies such as curved displays and flexible displays, lightness and thinness and an ultimate screen-to-body ratio of the electronic devices have become a trend. This design greatly reduces antenna arrangement space. In such an environment in which antennas are tightly arranged, it is difficult for a conventional antenna to meet a performance requirement of a plurality of communication frequency bands. Therefore, how to implement an antenna covering a plurality of frequency bands on a mobile phone becomes an urgent task.

SUMMARY

This application provides an electronic device. An antenna of the electronic device may cover a large quantity of frequency bands.

According to a first aspect, this application provides an electronic device. The electronic device includes a circuit board and an antenna structure. The antenna structure includes a first metal segment, a second metal segment, a first conductive segment, a second conductive segment, a first feed circuit, and a second feed circuit. A first gap is formed between the first metal segment and a side surface of the circuit board. A second gap is formed between the second metal segment and a side surface of the circuit board. The second gap is connected to the first gap.

In a first direction, the first metal segment includes a first portion, a first ground portion, and a second portion that are successively connected. The second metal segment includes a third portion, a second ground portion, and a fourth portion that are successively connected. A third gap is formed between the second portion and the third portion. The third gap is connected to the first gap and the second gap. An end portion that is of the first portion and that is opposite to the first ground portion is an open end that is not grounded. An end portion that is of the fourth portion and that is opposite to the second ground portion is an open end that is not grounded.

A negative electrode of the first feed circuit is grounded. A positive electrode of the first feed circuit is connected to the second portion of the first metal segment, and is connected to the third portion of the second metal segment.

The first conductive segment includes a first end and a second end. The first end is grounded. The second end is connected to the first portion of the first metal segment. The second conductive segment includes a third end and a fourth end. The third end is grounded. The fourth end is connected to the fourth portion of the second metal segment. A negative electrode of the second feed circuit is electrically connected between the first end and the second end. A positive electrode of the second feed circuit is electrically connected between the third end and the fourth end.

In this embodiment, the antenna structure may be excited to generate a plurality of resonance modes, so that an antenna may cover a plurality of frequency bands.

In an embodiment, the antenna structure further includes a first insulation segment and a second insulation segment. In the first direction, the first insulation segment is connected to the open end of the first portion. The second insulation segment is connected to the open end of the fourth portion.

In an embodiment, the electronic device includes a bezel, and the circuit board, the first feed circuit, and the second feed circuit are all located in a region enclosed by the bezel. The first metal segment, the second metal segment, the first insulation segment, and the second insulation segment are each a portion of the bezel. The bezel further includes a third insulation segment filled in the third gap.

In this embodiment, a radiator of the antenna structure is formed through the bezel, so that antenna design space may be saved.

In an embodiment, the antenna structure is configured to generate five resonance modes, to expand a frequency band in which the antenna structure radiates or receives a signal.

In an embodiment, the antenna structure further includes a bridge structure. One end of the bridge structure is connected to the second portion of the first metal segment. The other end of the bridge structure is connected to the third portion of the second metal segment. The positive electrode of the first feed circuit is connected to a middle portion of the bridge structure.

In this embodiment, the bridge structure has a simple structure, is easy to process, and is easy to implement.

In an embodiment, the antenna structure further includes a third conductive segment, a fourth conductive segment, a first matching circuit, and a second matching circuit. The second end of the first conductive segment is successively connected to the first matching circuit, the third conductive segment, and the first portion. The fourth end of the second conductive segment is successively connected to the second matching circuit, the fourth conductive segment, and the fourth portion.

In an embodiment, the first conductive segment and the second conductive segment are two symmetrical parallel conducting wires extending from a ground plane in the circuit board.

In an embodiment, a width direction of the electronic device is an X direction. A length direction of the electronic device is a Y direction. A thickness direction of the electronic device is a Z direction. In the Z direction, there is a height difference between the first conductive segment and the third conductive segment, and between the second conductive segment and the fourth conductive segment.

According to a second aspect, this application provides an electronic device. The electronic device includes a first metal segment, a second metal segment, a circuit board, a first-type antenna, and a second-type antenna. In a first direction, the first metal segment includes a first portion, a first ground portion, and a second portion that are successively connected. The second metal segment includes a third portion, a second ground portion, and a fourth portion that are successively connected. A third gap is formed between the second portion and the third portion, and an end portion that is of the first portion and that is opposite to the first ground portion is an open end that is not grounded. An end portion that is of the fourth portion and that is opposite to the second ground portion is an open end that is not grounded.

The first-type antenna includes a first gap and a first feed circuit. The first gap is connected to the third gap. The first gap is provided between the first metal segment and the circuit board, and between the second metal segment and the circuit board. The first gap includes a first side edge and a second side edge. The first side edge is formed by a side edge of the circuit board. The second side edge is formed by the first ground portion, the second portion, the third portion, and the second ground portion. A negative electrode of the first feed circuit is grounded. A positive electrode of the first feed circuit is connected to the second portion of the first metal segment, and is connected to the third portion of the second metal segment.

The second-type antenna includes the first portion, the first ground portion, the second ground portion, the fourth portion, a first conductive segment, a second conductive segment, and a second feed circuit. The first conductive segment includes a first end and a second end. The first end is grounded. The second end is connected to the first portion of the first metal segment. The second conductive segment includes a third end and a fourth end. The third end is grounded. The fourth end is connected to the fourth portion of the second metal segment. A negative electrode of the second feed circuit is electrically connected between the first end and the second end. A positive electrode of the second feed circuit is electrically connected between the third end and the fourth end.

In this embodiment, the antenna structure may be excited to generate a plurality of resonance modes, so that an antenna may cover a plurality of frequency bands.

In an embodiment, the antenna structure further includes a first insulation segment and a second insulation segment. In the first direction, the first insulation segment is connected to the open end of the first portion. The second insulation segment is connected to the open end of the fourth portion.

In an embodiment, the electronic device includes a bezel. The circuit board, the first feed circuit, and the second feed circuit are all located in a region enclosed by the bezel. The first metal segment and the second metal segment are each a portion of the bezel. The bezel further includes a third insulation segment filled in the third gap.

In this embodiment, a radiator of the antenna structure is formed through the bezel, so that antenna design space may be saved.

In an embodiment, the antenna structure is configured to generate five resonance modes, to expand a frequency band in which the antenna structure radiates or receives a signal.

In an embodiment, the antenna structure further includes a bridge structure. One end of the bridge structure is connected to the second portion of the first metal segment. The other end of the bridge structure is connected to the third portion of the second metal segment. The positive electrode of the first feed circuit is connected to a middle portion of the bridge structure.

In this embodiment, the bridge structure has a simple structure, is easy to process, and is easy to implement.

In an embodiment, the antenna structure further includes a third conductive segment, a fourth conductive segment, a first matching circuit, and a second matching circuit. The second end of the first conductive segment is successively connected to the first matching circuit, the third conductive segment, and the first portion. The fourth end of the second conductive segment is successively connected to the second matching circuit, the fourth conductive segment, and the fourth portion.

In an embodiment, the first conductive segment and the second conductive segment are two symmetrical parallel conducting wires extending from a ground plane in the circuit board.

In an embodiment, a width direction of the electronic device is an X direction. A length direction of the electronic device is a Y direction. A thickness direction of the electronic device is a Z direction. In the Z direction, there is a height difference between the first conductive segment and the third conductive segment, and between the second conductive segment and the fourth conductive segment.

According to a third aspect, this application provides an electronic device. The electronic device includes a circuit board and an antenna structure. The antenna structure includes a first metal segment, a second metal segment, a third metal segment, a first conductive segment, a second conductive segment, a first feed circuit, and a second feed circuit. A first gap is formed between the first metal segment and a side surface of the circuit board. A second gap is formed between the second metal segment and a side surface of the circuit board. A third gap is formed between the third metal segment and a side surface of the circuit board, and the first gap, the second gap, and the third gap are connected to each other.

In a first direction, the second metal segment includes a first portion, a first ground portion, and a second portion that are successively connected. A fourth gap is formed between one end of the first metal segment and the first portion, and the other end of the first metal segment is grounded. A fifth gap is formed between one end of the third metal segment and the second portion, and the other end of the third metal segment is grounded. The fourth gap and the fifth gap are connected to the first gap, the second gap, and the third gap.

A negative electrode of the first feed circuit is grounded, and a positive electrode of the first feed circuit is connected to the first portion and the second portion of the second metal segment.

The first conductive segment includes a first end and a second end. The first end is grounded, and the second end is connected to the first metal segment. The second conductive segment includes a third end and a fourth end. The third end is grounded. The fourth end is connected to the third metal segment. A negative electrode of the second feed circuit is electrically connected between the first end and the second end. A positive electrode of the second feed circuit is electrically connected between the third end and the fourth end.

In an embodiment, the antenna structure is configured to generate six resonance modes, to expand a frequency band in which the antenna structure radiates or receives a signal.

In an embodiment, the electronic device includes a bezel. The circuit board, the first feed circuit, and the second feed circuit are all located in a region enclosed by the bezel. The first metal segment, the second metal segment, and the third metal segment are each a portion of the bezel. The bezel further includes a first insulation segment filled in the fourth gap and a second insulation segment filled in the fifth gap.

In an embodiment, the antenna structure further includes a bridge structure. One end of the bridge structure is connected to the first portion of the second metal segment. The other end of the bridge structure is connected to the second portion of the second metal segment. The positive electrode of the first feed circuit is connected to a middle portion of the bridge structure.

In an embodiment, the antenna structure further includes a third conductive segment, a fourth conductive segment, a first matching circuit, and a second matching circuit. The second end of the first conductive segment is successively connected to the first matching circuit, the third conductive segment, and the first metal segment. The fourth end of the second conductive segment is successively connected to the second matching circuit, the fourth conductive segment, and the third metal segment.

In an embodiment, the first conductive segment and the second conductive segment are two symmetrical parallel conducting wires extending from a ground plane in the circuit board.

In an embodiment, a width direction of the electronic device is an X direction. A length direction of the electronic device is a Y direction. A thickness direction of the electronic device is a Z direction. In the Z direction, there is a height difference between the first conductive segment and the third conductive segment, and between the second conductive segment and the fourth conductive segment.

According to a fourth aspect, this application provides an electronic device. The electronic device includes a circuit board and an antenna structure. The antenna structure includes a first metal segment, a second metal segment, a third metal segment, a fourth metal segment, a first conductive segment, a second conductive segment, a first feed circuit, and a second feed circuit. A first gap is formed between the first metal segment and a side surface of the circuit board. A second gap is formed between the second metal segment and a side surface of the circuit board. A third gap is formed between the third metal segment and a side surface of the circuit board. A fourth gap is formed between the fourth metal segment and a side surface of the circuit board. The first gap, the second gap, the third gap, and the fourth gap are connected to each other.

In a first direction, a fifth gap is formed between the second metal segment and the first metal segment. A sixth gap is formed between the second metal segment and the third metal segment. A seventh gap is formed between the third metal segment and the fourth metal segment. The fifth gap, the sixth gap, and the seventh gap are connected to the first gap, the second gap, the third gap, and the fourth gap. An end portion that is of the first metal segment and that is opposite to the fifth gap is grounded. An end portion that is of the second metal segment and that faces the fifth gap is grounded. An end portion that is of the third metal segment and that faces the seventh gap is grounded. An end portion that is of the fourth metal segment and that is opposite to the seventh gap is grounded.

A negative electrode of the first feed circuit is grounded. A positive electrode of the first feed circuit is connected to the second metal segment and the third metal segment.

The first conductive segment includes a first end and a second end. The first end is grounded. The second end is connected to the first metal segment. The second conductive segment includes a third end and a fourth end. The third end is grounded. The fourth end is connected to the fourth metal segment. A negative electrode of the second feed circuit is electrically connected between the first end and the second end. A positive electrode of the second feed circuit is electrically connected between the third end and the fourth end.

In this embodiment, the antenna structure may be excited to generate a plurality of resonance modes, so that an antenna may cover a plurality of frequency bands.

In an embodiment, the electronic device includes a bezel. The circuit board, the first feed circuit, and the second feed circuit are all located in a region enclosed by the bezel. The first metal segment, the second metal segment, the third metal segment, and the fourth metal segment are each a portion of the bezel. The bezel further includes a first insulation segment filled in the fifth gap, a second insulation segment filled in the sixth gap, and a third insulation segment filled in the seventh gap.

In this embodiment, a radiator of the antenna structure is formed through the bezel, so that antenna design space may be saved.

In an embodiment, the antenna structure further includes a bridge structure. One end of the bridge structure is connected to the first portion of the second metal segment. The other end of the bridge structure is connected to the second portion of the second metal segment. The positive electrode of the first feed circuit is connected to a middle portion of the bridge structure.

In this embodiment, the bridge structure has a simple structure, is easy to process, and is easy to implement.

In an embodiment, the antenna structure further includes a third conductive segment, a fourth conductive segment, a first matching circuit, and a second matching circuit. The second end of the first conductive segment is successively connected to the first matching circuit, the third conductive segment, and the first metal segment. The fourth end of the second conductive segment is successively connected to the second matching circuit, the fourth conductive segment, and the third metal segment.

In this embodiment, the first matching circuit is configured to match an antenna impedance. In this case, the first matching circuit may be configured to reduce a size of the first conductive segment and a size of the third conductive segment. The second matching circuit is also configured to match an antenna impedance. In this case, the second matching circuit may be configured to reduce a size of the second conductive segment and a size of the fourth conductive segment.

In an embodiment, the first conductive segment and the second conductive segment are two symmetrical parallel conducting wires extending from a ground plane in the circuit board.

In an embodiment, a width direction of the electronic device is an X direction. A length direction of the electronic device is a Y direction, and a thickness direction of the electronic device is a Z direction. In the Z direction, there is a height difference between the first conductive segment and the third conductive segment, and between the second conductive segment and the fourth conductive segment.

According to a fifth aspect, this application provides an electronic device. The electronic device includes a circuit board and an antenna structure. The antenna structure includes a first metal segment, a second metal segment, a third metal segment, a first conductive segment, a second conductive segment, a first feed circuit, and a second feed circuit. A first gap is formed between the first metal segment and a side surface of the circuit board. A second gap is formed between the second metal segment and a side surface of the circuit board. A third gap is formed between the third metal segment and a side surface of the circuit board. The first gap, the second gap, and the third gap are connected to each other.

In a first direction, the second metal segment includes a first portion, a first ground portion, and a second portion that are successively connected. A fourth gap is formed between the first metal segment and the first portion. A fifth gap is formed between the third metal segment and the second portion. The fourth gap and the fifth gap are connected to the first gap, the second gap, and the third gap. An end portion that is of the first metal segment and that faces the second metal segment is grounded. An end portion that is of the fourth metal segment and that faces the second metal segment is grounded.

A negative electrode of the first feed circuit is grounded. A positive electrode of the first feed circuit is connected to the first portion and the second portion of the second metal segment.

The first conductive segment includes a first end and a second end. The first end is grounded. The second end is connected to the first metal segment. The second conductive segment includes a third end and a fourth end. The third end is grounded. The fourth end is connected to the third metal segment. A negative electrode of the second feed circuit is electrically connected between the first end and the second end. A positive electrode of the second feed circuit is electrically connected between the third end and the fourth end.

In this embodiment, the antenna structure may be excited to generate a plurality of resonance modes, so that an antenna may cover a plurality of frequency bands.

In an embodiment, the electronic device includes a bezel. The circuit board, the first feed circuit, and the second feed circuit are all located in a region enclosed by the bezel. The first metal segment, the second metal segment, and the third metal segment are each a portion of the bezel. The bezel further includes a first insulation segment filled in the fourth gap and a second insulation segment filled in the fifth gap.

In this embodiment, a radiator of the antenna structure is formed through the bezel, so that antenna design space may be saved.

In an embodiment, the antenna structure further includes a bridge structure. One end of the bridge structure is connected to the first portion of the second metal segment. The other end of the bridge structure is connected to the second portion of the second metal segment. The positive electrode of the first feed circuit is connected to a middle portion of the bridge structure.

In this embodiment, the bridge structure has a simple structure, is easy to process, and is easy to implement.

In an embodiment, the antenna structure further includes a third conductive segment, a fourth conductive segment, a first matching circuit, and a second matching circuit. The second end of the first conductive segment is successively connected to the first matching circuit, the third conductive segment, and the first metal segment. The fourth end of the second conductive segment is successively connected to the second matching circuit, the fourth conductive segment, and the third metal segment.

In this embodiment, the first matching circuit is configured to match an antenna impedance. In this case, the first matching circuit may be configured to reduce a size of the first conductive segment and a size of the third conductive segment. The second matching circuit is also configured to match an antenna impedance. In this case, the second matching circuit may be configured to reduce a size of the second conductive segment and a size of the fourth conductive segment.

In an embodiment, the first conductive segment and the second conductive segment are two symmetrical parallel conducting wires extending from a ground plane in the circuit board.

In an embodiment, a width direction of the electronic device is an X direction. A length direction of the electronic device is a Y direction. A thickness direction of the electronic device is a Z direction. In the Z direction, there is a height difference between the first conductive segment and the third conductive segment, and between the second conductive segment and the fourth conductive segment.

According to a sixth aspect, this application provides an electronic device. The electronic device includes a circuit board and an antenna structure. The antenna structure includes a first metal segment, a second metal segment, a third metal segment, a first conductive segment, a second conductive segment, a first feed circuit, and a second feed circuit. A first gap is formed between the first metal segment and a side surface of the circuit board. A second gap is formed between the second metal segment and a side surface of the circuit board. A third gap is formed between the third metal segment and a side surface of the circuit board. The first gap, the second gap, and the third gap are connected to each other.

In a first direction, a fourth gap is formed between one end of the first metal segment and the second metal segment, and the other end of the first metal segment is grounded. A fifth gap is formed between one end of the third metal segment and the second metal segment, and the other end of the fifth gap is grounded. The fourth gap and the fifth gap are connected to the first gap, the second gap, and the third gap. An end portion that is of the second metal segment and that faces the fourth gap is grounded, and an end portion that is of the second metal segment and that faces the fifth gap is grounded.

A negative electrode of the first feed circuit is grounded, and a positive electrode of the first feed circuit is connected to the second metal segment.

The first conductive segment includes a first end and a second end. The first end is grounded, and the second end is connected to the first metal segment. The second conductive segment includes a third end and a fourth end. The third end is grounded. The fourth end is connected to the third metal segment. A negative electrode of the second feed circuit is electrically connected between the first end and the second end. A positive electrode of the second feed circuit is electrically connected between the third end and the fourth end.

In this embodiment, the antenna structure may be excited to generate a plurality of resonance modes, so that an antenna may cover a plurality of frequency bands.

In an embodiment, the electronic device includes a bezel. The circuit board, the first feed circuit, and the second feed circuit are all located in a region enclosed by the bezel. The first metal segment, the second metal segment, and the third metal segment are each a portion of the bezel. The bezel further includes a first insulation segment filled in the fourth gap and a second insulation segment filled in the fifth gap.

In this embodiment, a radiator of the antenna structure is formed through the bezel, so that antenna design space may be saved.

In an embodiment, the antenna structure further includes a third conductive segment, a fourth conductive segment, a first matching circuit, and a second matching circuit. The second end of the first conductive segment is successively connected to the first matching circuit, the third conductive segment, and the first metal segment. The fourth end of the second conductive segment is successively connected to the second matching circuit, the fourth conductive segment, and the third metal segment.

In this embodiment, the first matching circuit is configured to match an antenna impedance. In this case, the first matching circuit may be configured to reduce a size of the first conductive segment and a size of the third conductive segment. The second matching circuit is also configured to match an antenna impedance. In this case, the second matching circuit may be configured to reduce a size of the second conductive segment and a size of the fourth conductive segment.

In an embodiment, the first conductive segment and the second conductive segment are two symmetrical parallel conducting wires extending from a ground plane in the circuit board.

In an embodiment, a width direction of the electronic device is an X direction. A length direction of the electronic device is a Y direction. A thickness direction of the electronic device is a Z direction. In the Z direction, there is a height difference between the first conductive segment and the third conductive segment, and between the second conductive segment and the fourth conductive segment.

BRIEF DESCRIPTION OF DRAWINGS

FIG. 18 is a curve graph of a reflection coefficient of the antenna structure shown in

FIG. 17;

DESCRIPTION OF EMBODIMENTS

The following describes embodiments of this application with reference to the accompanying drawings in embodiments of this application.

Figure 1:
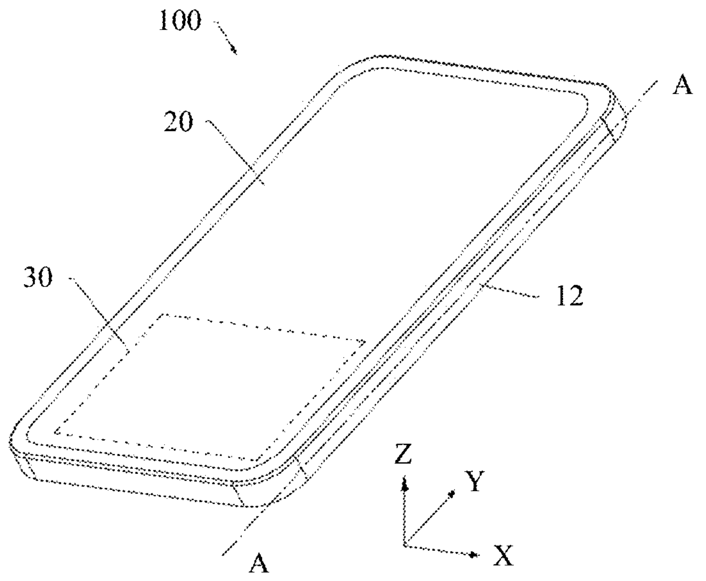
FIG. 1 is a schematic diagram of a structure of an embodiment of an electronic device according to an embodiment of this application.

FIG. 1 is a schematic diagram of a structure of an embodiment of an electronic device according to an embodiment of this application. The electronic device 100 may be a mobile phone, a tablet personal computer, a laptop computer, a personal digital assistant (PDA), a camera, a personal computer, a notebook computer, an in-vehicle device, a wearable device, augmented reality (AR) glasses, an AR helmet, virtual reality (VR) glasses, or a VR helmet. In the embodiment shown in FIG. 1, descriptions are provided by using an example in which the electronic device 100 is a mobile phone. For ease of description, as shown in FIG. 1, a width direction of the electronic device 100 is defined as an X axis. A length direction of the electronic device 100 is a Y axis. A thickness direction of the electronic device 100 is a Z axis.

Figure 2:
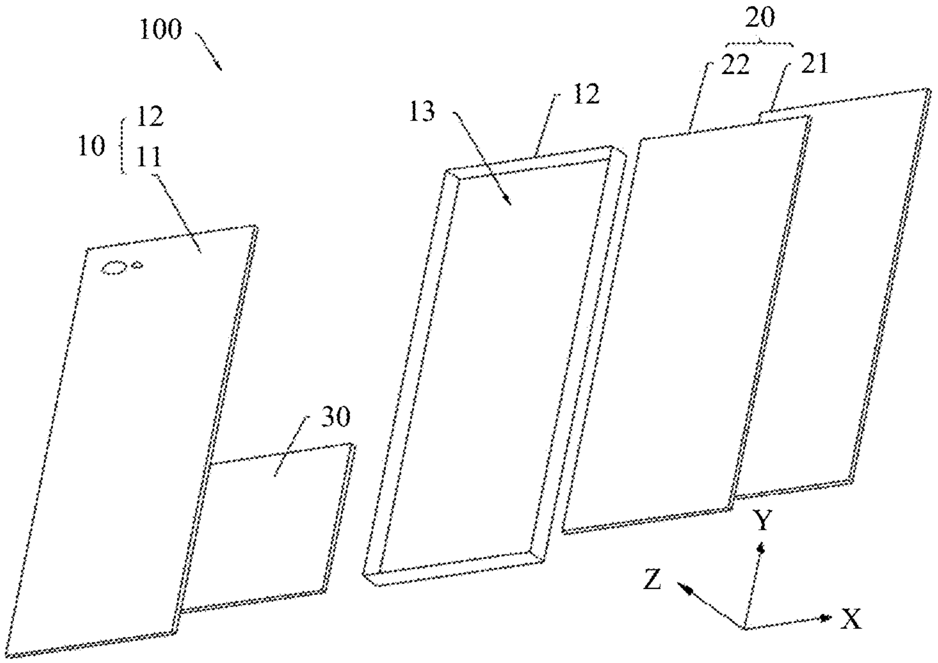
FIG. 2 is a schematic exploded view of the electronic device shown in FIG. 1.

Refer to FIG. 2, with reference to FIG. 1, FIG. 2 is an exploded schematic diagram of the electronic device shown in FIG. 1. The electronic device 100 includes a housing 10, a screen 20, and a circuit board 30.

The housing 10 may be configured to support the screen 20 and a related component in the electronic device 100.

In an embodiment, the housing 10 includes a rear cover 11 and a bezel 12. The rear cover 11 is disposed opposite to the screen 20. The rear cover 11 and the screen 20 are mounted on two opposite sides of the bezel 12. In this case, the rear cover 11, the bezel 12, and the screen 20 jointly enclose an accommodating space 13. The accommodating space 13 may be used to accommodate a component of the electronic device 100, for example, a battery, a loudspeaker, a microphone, or an earpiece. FIG. 1 shows a structure that is roughly cuboid and that is enclosed by the rear cover 11, the bezel 12, and the screen 20.

In an embodiment, the rear cover 11 may be fixedly connected to the bezel 12 by using adhesive. In another embodiment, the rear cover 11 and the bezel 12 may alternatively form an integrated structure, that is, the rear cover 11 and the bezel 12 are integrally formed.

The rear cover 11 may be made of a metal material, or an insulation material, for example, glass or plastic. In addition, the bezel 12 may be made of a metal material, or an insulation material, for example, plastic or glass.

The screen 20 is mounted on the housing 10. The screen 20 may be configured to display an image, a text, and the like.

In an embodiment, the screen 20 includes a protection cover 21 and a display 22. The protection cover 21 is stacked on the display 22. The protection cover 21 may be disposed against the display 22, and may be mainly configured to protect the display 22 against dust. A material of the protection cover 21 may be but is not limited to glass. The display 22 may be an organic light-emitting diode (OLED) display, an active matrix organic light-emitting diode or active-matrix organic light-emitting diode (acAMOLED) display, a mini light-emitting diode display, or a micro light-emitting diode display, micro organic light-emitting diode display, quantum dot light-emitting diode (QLED) display.

The circuit board 30 may be configured to mount an electronic component of the electronic device 100. For example, the electronic component may include a central processing unit (CPU), a battery management unit, and a baseband processing unit. The circuit board 30 is located between the screen 20 and the rear cover 11, that is, the circuit board 30 is located in the accommodating space 13. A position of the circuit board 30 in the electronic device 100 is not limited to a position shown by a dashed line in FIG. 1.

In addition, the circuit board 30 may be a rigid circuit board, or may be a flexible circuit board, or may be a combination of a rigid circuit board and a flexible circuit board. In addition, the circuit board 30 may be an FR-4 dielectric board, or may be a Rogers dielectric board, or may be a hybrid dielectric board of Rogers and FR-4, or the like. Herein, FR-4 is a grade designation for a flame-resistant material, and the Rogers dielectric board is a high frequency board.

In addition, the electronic device 100 includes a plurality of antennas. In this application, "plurality" means at least two. The antenna is configured to transmit and receive an electromagnetic wave signal. Each antenna in the electronic device 100 may be configured to cover one or more communication frequency bands. Different antennas may be further reused to improve utilization of the antennas.

The electronic device 100 may communicate with a network or another device through an antenna or by using one or more of the following communication technologies. The communication technology includes a Bluetooth (BT) communication technology, a global positioning system (GPS) communication technology, a wireless fidelity (Wi-Fi) communication technology, a global system for mobile communication (GSM) communication technology, a wideband code division multiple access (WCDMA) communication technology, a long term evolution (LTE) communication technology, a 5G communication technology, a SUB-6G communication technology, another future communication technology, and the like.

In addition, the antenna includes a ground plane. The ground plane may be used to ground a radiator of the antenna. The ground plane may be the circuit board 30 of the electronic device 100, or may be a portion of the housing 10 of the electronic device 100. Certainly, the ground plane may alternatively be integrated into another component of the electronic device 100, for example, the screen 20. In this application, an example in which the ground plane is the circuit board 30 is used for description.

It may be understood that, for example, FIG. 1 and FIG. 2 merely show some components included in the electronic device 100. Actual shapes, actual sizes, and actual structures of these components are not limited by FIG. 1 and FIG. 2.

In addition, to bring a more comfortable visual experience to a user, the electronic device 100 may use a bezel-less screen industrial design (ID). The bezel-less screen means a large screen-to-body ratio (usually over 90%). A width of the bezel 12 of the bezel-less screen is greatly reduced, and internal components of the electronic device 100, such as a front-facing camera, a phone receiver, a fingerprint sensor, and an antenna, need to be rearranged. Especially for the antenna design, the clearance region is reduced and the antenna space is further reduced. However, the size, bandwidth, and efficiency of the antenna are correlated and affect each other. If the antenna size (space) is reduced, the efficiency-bandwidth product of the antenna is definitely reduced.

In a conventional antenna design, when antenna design space is further reduced, on a mobile phone with a common ID such as a metal bezel or a glass rear cover, a plurality of different radiators are usually disposed around the entire mobile phone to implement a multi-input multi-output (MIMO) antenna. However, the plurality of different radiators need to meet a high requirement in terms of an antenna form, grounding, feed, and the like, so as to implement high antenna isolation and a low envelope correlation coefficient (ECC).

An antenna design solution provided in this application may be applied to a MIMO antenna. A high-isolation and low-ECC feature of the MIMO antenna may be implemented by setting an antenna structure and using two feed manners: a symmetric feed manner and an anti-symmetric feed manner. In addition, the antenna structure can further implement an antenna covering a large quantity of frequency bands, so that the electronic device 100 having limited space can also transmit or receive electromagnetic wave signals of the large quantity of frequency bands.

First, four antenna modes in this application are described.

1. Common Mode (CM) Slot Antenna Mode

Figure 3A:
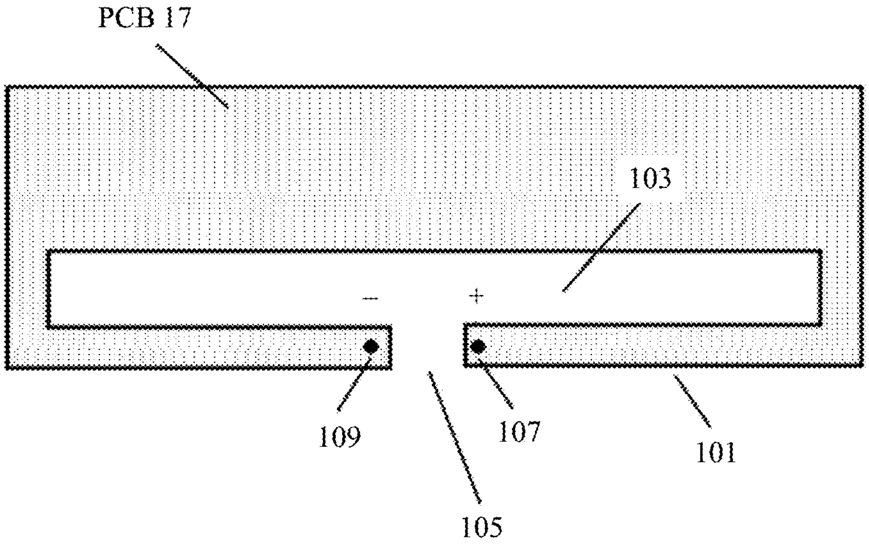
FIG. 3A is a schematic diagram of a common mode slot antenna according to an embodiment this application.

FIG. 3A is a schematic diagram of a common mode slot antenna according to this application. The slot antenna 101 may include a gap 103, a feed point 107, and a feed point 109. The gap 103 may be opened on a ground plane of the PCB 17. An opening 105 is disposed on a side of the gap 103, and the opening 105 may be specifically disposed in a middle position of the side. The feed point 107 and the feed point 109 may be respectively disposed on two sides of the opening 105. The feed point 107 and the feed point 109 may be respectively configured to connect to a positive electrode and a negative electrode of a feed source of the slot antenna 101. For example, a coaxial transmission line is used to feed the slot antenna 101. A central conductor (transmission line center conductor) of the coaxial transmission line may be connected to the feed point 107 through a transmission line, and an outer conductor (transmission line outer conductor) of the coaxial transmission line may be connected to the feed point 109 through a transmission line. The outer conductor of the coaxial transmission line is grounded.

In other words, the slot antenna 101 may feed at the opening 105, and the opening 105 may also be referred to as a feed position. A positive electrode of a feed source may be connected to one side of the opening 105, and a negative electrode of the feed source may be connected to the other side of the opening 105.

Figure 3B:
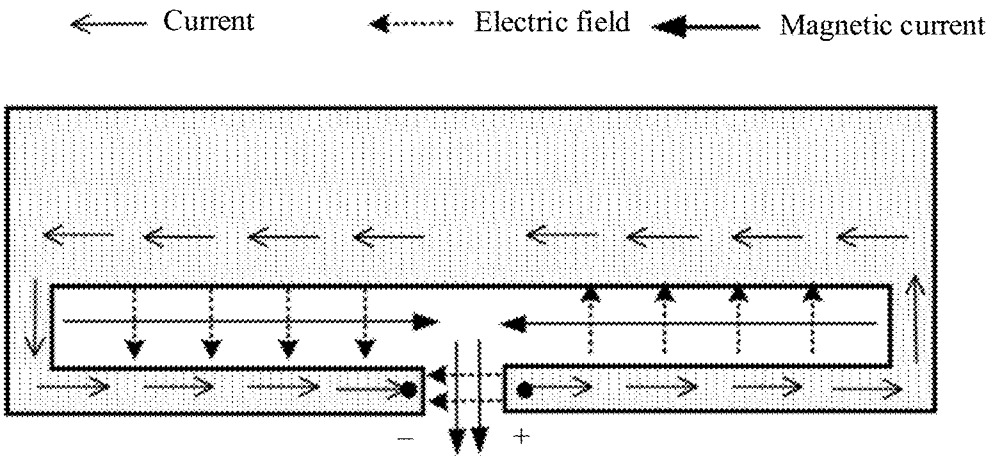
FIG. 3B is a schematic diagram of distribution of a current, an electric field, and a magnetic current in a common mode slot antenna mode.

FIG. 3B is a schematic diagram of distribution of a current, an electric field, and a magnetic current in a common mode slot antenna mode. The current is codirectionally distributed on two sides of the middle position of the slot antenna 101, but the electric field and the magnetic current are reversely distributed on two sides of the middle position of the slot antenna 101. The feed structure shown in FIG. 3A may be referred to as an anti-symmetric feed structure. This slot antenna mode shown in FIG. 3B may be referred to as a CM slot antenna mode. The electric field, the current, and the magnetic current shown in FIG. 3B may be respectively referred to as an electric field, a current, and a magnetic current in the CM slot antenna mode.

The current and the electric field in the CM slot antenna mode are generated when slots on both sides of the middle position of the slot antenna 101 respectively work in a ¼ wavelength mode: The current is weak at the middle position of the slot antenna 101, and is strong at both ends of the slot antenna 101. The electric field is strong at the middle position of the slot antenna 101 and weak at both ends of the slot antenna 101.

2. Differential Mode (DM) Slot Antenna Mode

Figure 4A:
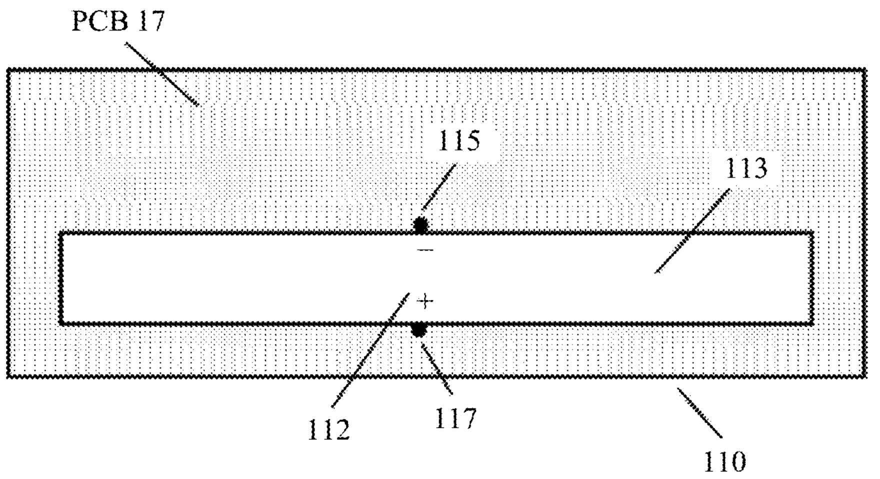
FIG. 4A is a schematic diagram of a differential mode slot antenna according to an embodiment this application.

FIG. 4A is a schematic diagram of a differential mode slot antenna according to this application. The slot antenna 110 may include a gap 113, a feed point 117, and a feed point 115. The gap 113 may be opened on a ground plane of the PCB 17. The feed point 117 and the feed point 115 may be respectively disposed on a middle position on two side edges of the gap 113. The feed point 117 and the feed point 115 may be respectively configured to connect to a positive electrode and a negative electrode of a feed source of the slot antenna 110. For example, a coaxial transmission line is used to feed the slot antenna 110. A central conductor of the coaxial transmission line may be connected to the feed point 117 by using the transmission line, and an outer conductor of the coaxial transmission line may be connected to the feed point 115 by using the transmission line. The outer conductor of the coaxial transmission line is grounded.

In other words, a middle position 112 of the slot antenna 110 is connected to a feed source, and the middle position 112 may also be referred to as a feed position. A positive electrode of the feed source may be connected to one side edge of the gap 113, and a negative electrode of the feed source may be connected to the other side edge of the gap 113.

Figure 4B:
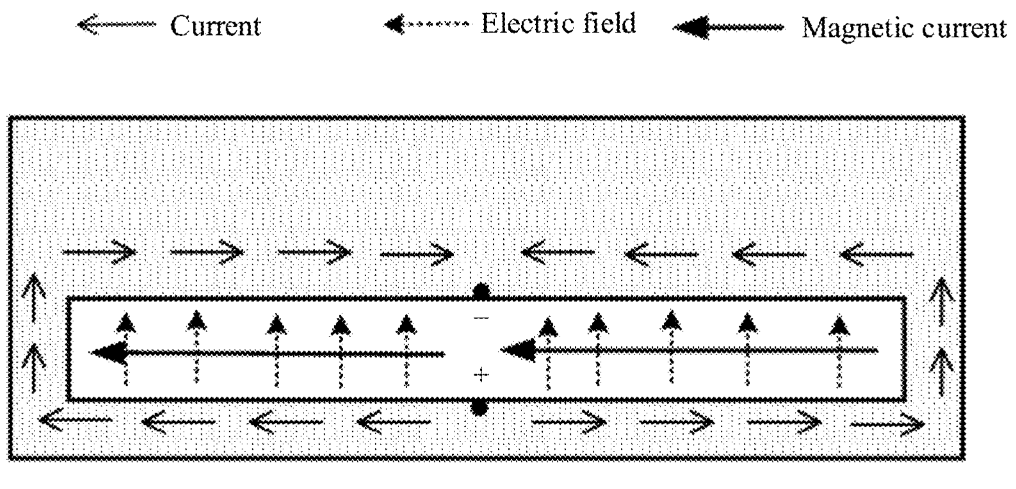
FIG. 4B is a schematic diagram of distribution of a current, an electric field, and a magnetic current in a differential mode slot antenna mode.

FIG. 4B is a schematic diagram of distribution of a current, an electric field, and a magnetic current in a differential mode slot antenna mode. The current is reversely distributed on two sides of the middle position 112 of the slot antenna 110, but the electric field and the magnetic current are codirectionally distributed on two sides of the middle position 112 of the slot antenna 110. The feed structure shown in FIG. 4A may be referred to as a symmetric feed structure. This slot antenna mode shown in FIG. 4B may be referred to as a DM slot antenna mode. The electric field, the current, and the magnetic current shown in FIG. 4B may be distributed as an electric field, a current, and a magnetic current in the DM slot antenna mode.

The current and the electric field of the DM slot antenna mode are generated when the entire gap 113 works in a ½ wavelength mode. The current is weak at the middle position of the slot antenna 110, and is strong at both ends of the slot antenna 110. The electric field is strong at the middle position of the slot antenna 110 and weak at both ends of the slot antenna 110.

3. Common Mode (CM) Wire Antenna Mode

Figure 5A:
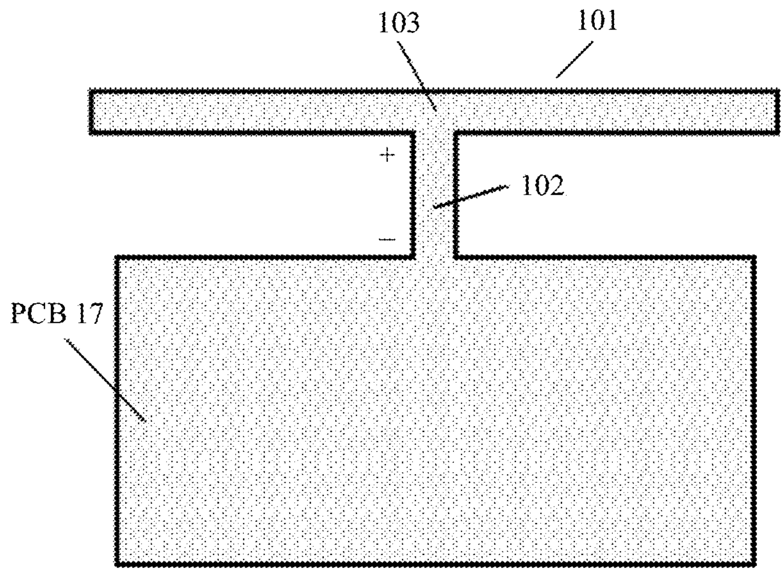
FIG. 5A shows a common mode wire antenna according to an embodiment this application.

FIG. 5A shows a common mode wire antenna according to this application. The wire antenna 101 is connected to a feed source at a middle position 103. A positive electrode of the feed source is connected to the middle position 103 of the wire antenna 101, and a negative electrode of the feed source is connected to the ground (for example, a ground plane).

Figure 5B:
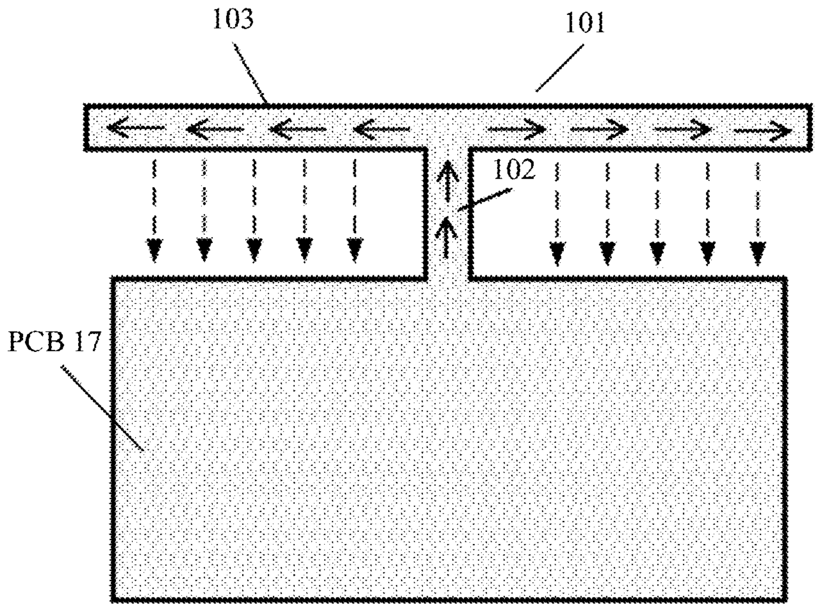
FIG. 5B shows a schematic diagram of distribution of a current and an electric field in a common mode wire antenna mode according to an embodiment this application.

FIG. 5B shows a schematic diagram of distribution of a current and an electric field in a common mode wire antenna mode according to this application. The current is reverse in direction on both sides of the middle position 103, and is symmetrically distributed. The electric field is distributed on two sides of the middle position 103, and is codirectionally distributed. As shown in FIG. 5B, the current at a feed 102 is codirectionally distributed. Based on codirectional current distribution at the feed 102, this feed structure shown in FIG. 5A may be referred to as a symmetric feed structure. The wire antenna mode shown in FIG. 5B may be referred to as a CM wire antenna mode. The current and the electric field shown in FIG. 5B may be respectively referred to as a current and an electric field in the CM wire antenna mode.

The current and the electric field in the CM wire antenna mode are generated by two horizontal stubs that are on two sides of the middle position 103 and that are of the wire antenna 101 as a ¼ wavelength antenna. The current is strong at the middle position 103 of the wire antenna 101 and weak at both ends of the wire antenna 101. The electric field is weak at the middle position 103 of the wire antenna 101 and strong at both ends of the wire antenna 101.

4. Differential Mode (DM) Wire Antenna Mode

Figure 6A:
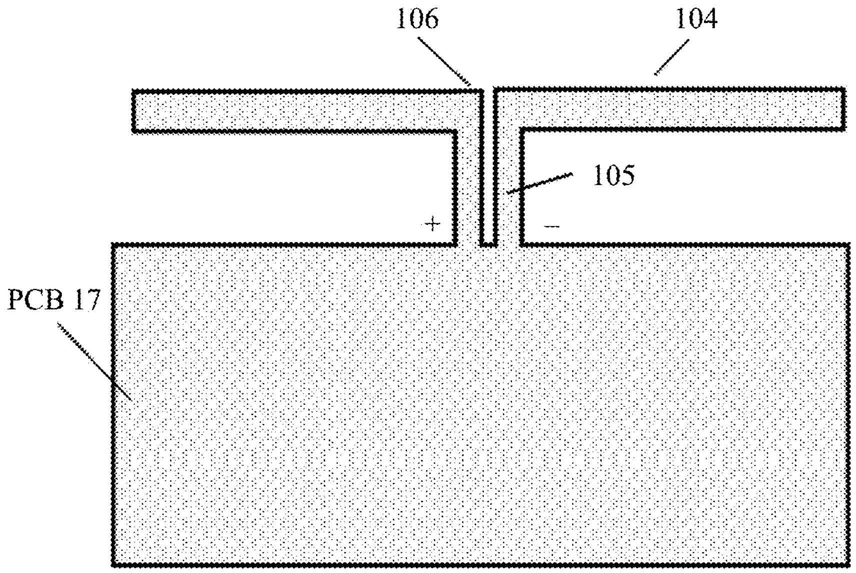
FIG. 6A shows a differential mode wire antenna according to an embodiment this application.

FIG. 6A shows a differential mode wire antenna according to this application. The wire antenna 104 is connected to a feed source at a middle position 106. A positive electrode of the feed source is connected to one side of the middle position 106, and a negative electrode of the feed source is connected to the other side of the middle position 106.

Figure 6B:
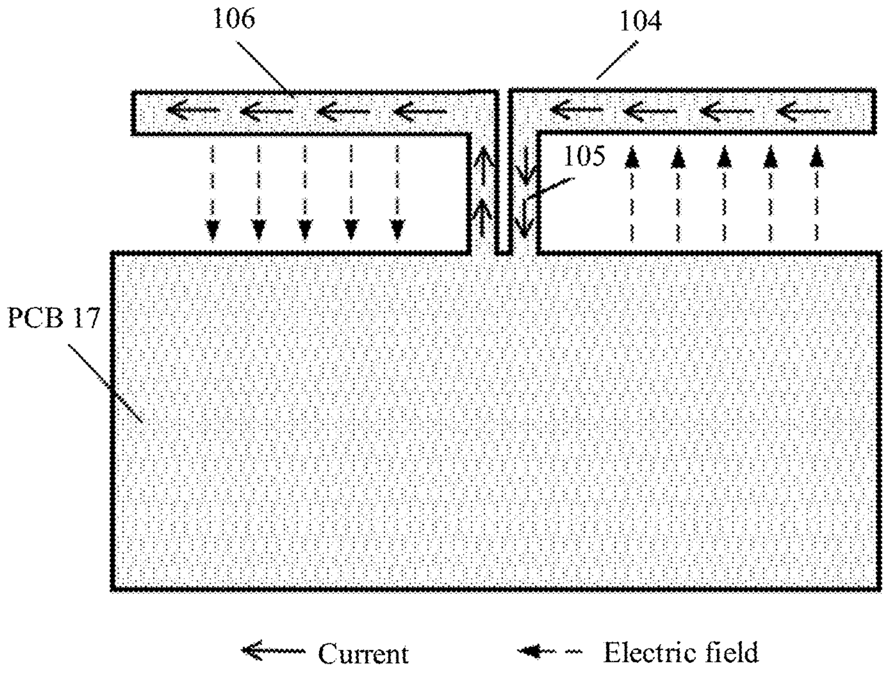
FIG. 6B shows distribution of a current and an electric field in a differential mode wire antenna mode according to an embodiment this application.

FIG. 6B shows distribution of a current and an electric field in a differential mode wire antenna mode according to this application. The current is codirectional on both sides of the middle position 106, and is distributed in an anti-symmetric manner. The electric field is distributed reversely on both sides of the middle position 106. As shown in FIG. 6B, the current at a feed 105 is reversely distributed. Based on reverse current distribution at the feed 105, this feed structure shown in FIG. 6A may be referred to as an anti-symmetric feed structure. The wire antenna mode shown in FIG. 6B may be referred to as a DM wire antenna mode. The current and the electric field shown in FIG. 6B may be respectively referred to as a current and an electric field in the DM wire antenna mode.

The current and the electric field in the DM wire antenna mode are generated by the entire wire antenna 104 as a ½ wavelength antenna. The current is strong at the middle position 106 of the wire antenna 104 and weak at both ends of the wire antenna 104. The electric field is weak at the middle position 106 of the wire antenna 104 and strong at both ends of the wire antenna 104.

In a first embodiment, an antenna structure including a slot antenna and a wire antenna is disposed, and two feed manners are used, so that the antenna structure is excited to generate four antenna modes: a common mode slot antenna, a differential mode slot antenna, a common mode wire antenna, and a differential mode wire antenna. In this way, in this embodiment, two feed manners may be used, so that the antenna structure including the slot antenna and the wire antenna is excited to generate a plurality of resonance modes. This implements that an antenna may cover a plurality of frequency bands.

Figure 7:
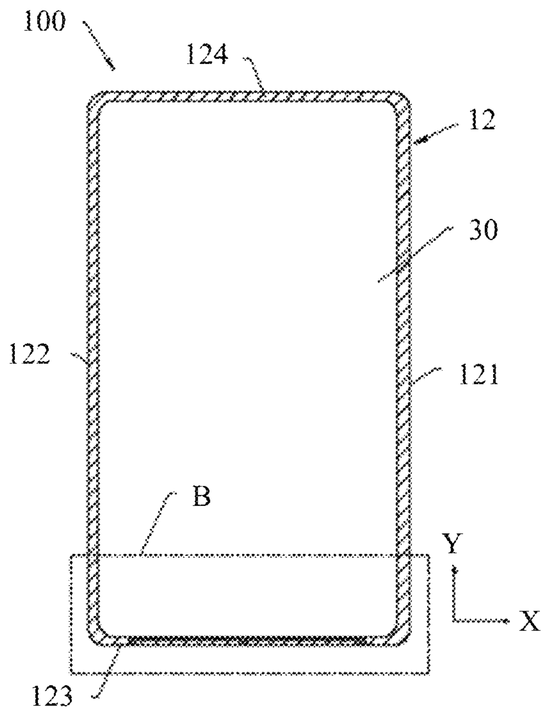
FIG. 7 is an A-A schematic sectional view of the electronic device shown in FIG. 1.

FIG. 7 is an A-A partial schematic sectional view of the electronic device shown in FIG. 1. The bezel 12 includes a first long bezel 121 and a second long bezel 122 that are disposed opposite to each other, and a first short bezel 123 and a second short bezel 124 that are disposed opposite to each other. The first short bezel 123 and the second short bezel 124 are connected between the first long bezel 121 and the second long bezel 122. In this case, the bezel 12 is rectangular or roughly rectangular. The circuit board 30 is located in a region enclosed by the first long bezel 121, the second long bezel 122, the first short bezel 123, and the second short bezel 124. In this embodiment, an example in which a radiator of the antenna structure is a portion of the first short bezel 123 is used for description. In another embodiment, a radiator of the antenna structure may alternatively be a portion of the first long bezel 121, a portion of the second long bezel 122, or a portion of the second short bezel 124. Certainly, in another embodiment, two or more of a portion of the first long bezel 121, a portion of the second long bezel 122, a portion of the first short bezel 123, and a portion of the second short bezel 124 may be used as radiators of the antenna structure.

Figure 8:
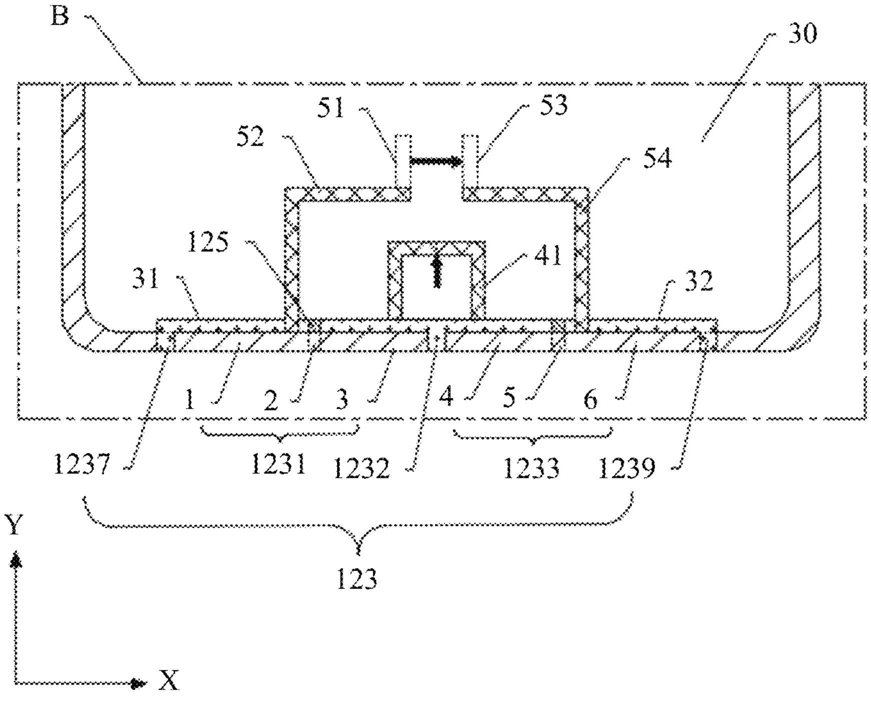
FIG. 8 is an enlarged schematic diagram of an embodiment at B of the electronic device shown in FIG. 7.

FIG. 8 is an enlarged schematic diagram of an embodiment at B of the electronic device shown in FIG. 7.

First, a structure of a radiator of a slot antenna and a structure of a radiator of a wire antenna are described in detail with reference to related accompanying drawings.

In a first direction (FIG. 8 shows that the first direction is an X direction, and in another embodiment, the first direction may also be a Y direction), the first short bezel 123 includes a first metal segment 1231, a first insulation segment 1232, and a second metal segment 1233 that are successively connected, that is, the first insulation segment 1232 is connected between the first metal segment 1231 and the second metal segment 1233. In this case, the first insulation segment 1232 electrically isolates the first metal segment 1231 from the second metal segment 1233. It may be understood that a third gap is formed between the first metal segment 1231 and the second metal segment 1233. The first insulation segment 1232 may be formed by filling the third gap with an insulation material. For example, the insulation material may be a material such as polymer, glass, or ceramic, or a combination of these materials. In another embodiment, the third gap may be filled with air, that is, the third gap is not filled with any insulation material.

In another embodiment, at least one suspended metal segment may also be disposed in the third gap. In this case, the third gap is divided into a plurality of portions by the suspended metal segment.

In another embodiment, locations of the first metal segment 1231 and the second metal segment 1233 may be exchanged. In this case, the first metal segment 1231 is located on a right side of the first insulation segment 1232. The second metal segment 1233 is located on a left side of the first insulation segment 1232.

The first metal segment 1231 includes a first portion 1, a first ground portion 2, and a second portion 3 that are successively connected. In other words, the first ground portion 2 is connected between the first portion 1 and the second portion 3. The first ground portion 2 is a grounded portion in the first metal segment 1231. A size and a shape of the first ground portion 2 are not limited to those shown in FIG. 8.

It may be understood that the first ground portion 2 may be grounded in a plurality of manners. In an embodiment, the bezel 12 includes a connection stub 125. The connection stub 125 is made of a conductive material, for example, a metal material. In this case, the first ground portion 2 is electrically connected to the ground plane of the circuit board 30 through the connection stub 125. The connection stub 125 and the first metal segment 1231 may be an integrated structure. Certainly, the connection stub 125 may also be fastened to the first metal segment 1231 through soldering or bonding. In another embodiment, the electronic device 100 may also include a dome. The first ground portion 2 is electrically connected to the ground plane of the circuit board 30 through the dome.

In addition, a first gap 31 is disposed between the first metal segment 1231 and the circuit board 30. The first gap 31 connects the first metal segment 1231 and the second metal segment 1233, to form a third gap. In an embodiment, the first gap 31 may be filled with an insulation material. For example, the first gap 31 may be filled with a material such as polymer, glass, or ceramic, or a combination of these materials. In another embodiment, the first gap 31 may be filled with air, that is, the first gap 31 is not filled with any insulation material.

In addition, the second metal segment 1233 includes a third portion 4, a second ground portion 5, and a third portion 6. It may be understood that the second ground portion 5 is a grounded portion of the second metal segment 1233. Specifically, the second ground portion 5 is electrically connected to the ground plane of the circuit board 30. For an electrical connection manner between the second ground portion 5 and the ground plane of the circuit board 30, refer to an electrical connection manner between the first ground portion 2 and the ground plane of the circuit board 30.

In addition, a second gap 32 is disposed between the second metal segment 1233 and the circuit board 30. The second gap 32 is connected to the first gap 31. In addition, the second gap 32 connects the first metal segment 1231 and the second metal segment 1233, to form a third gap. For a disposition manner of the second gap 32, refer to the disposition manner of the first gap 31, and details are not described herein again.

Figure 9:
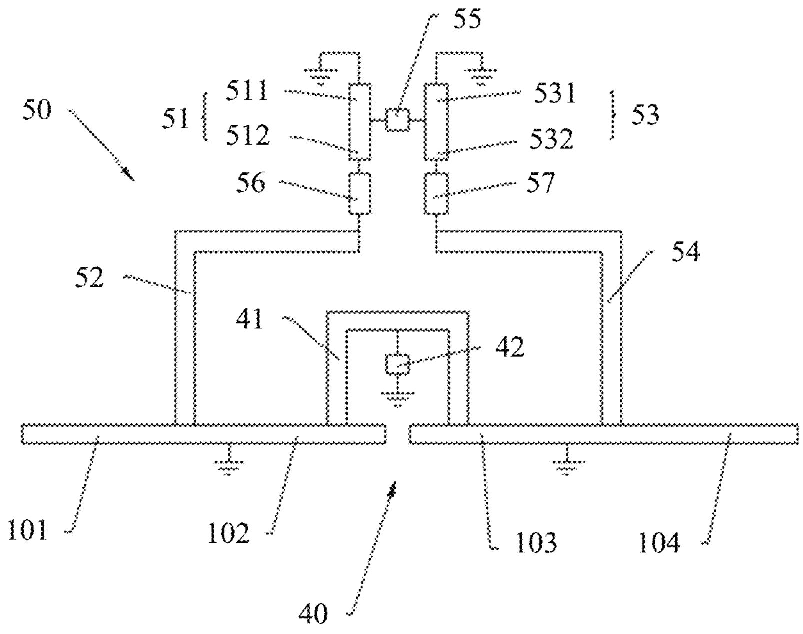
FIG. 9 is a schematic diagram of an embodiment of an antenna structure of the electronic device shown in FIG. 8.

Refer to FIG. 9, with reference to FIG. 8, FIG. 9 is a schematic diagram of an embodiment of an antenna structure of the electronic device shown in FIG. 8. The first portion 1 and the first ground portion 2 form a first radiator 101. The second portion 3 and the first ground portion 2 form the second radiator 102. In this case, the first ground portion 2 is a ground end of the first radiator 101 and the second radiator 102. An end portion that is of the first radiator 101 and that is away from the first ground portion 2 is an open end that is not grounded. An end portion that is of the second radiator 102 and that is away from the first ground portion 2 is an open end that is not grounded.

In addition, the third portion 4 and the second ground portion 5 form a third radiator 103. The fourth portion 6 and the second ground portion 5 form the fourth radiator 104. In this case, the second ground portion 5 is a ground end of the third radiator 103 and the fourth radiator 104, and an end portion that is of the third radiator 103 and that is away from the second ground portion 5 is an open end that is not grounded. An end portion that is of the fourth radiator 104 and that is away from the second ground portion 5 is an open end that is not grounded.

In this way, the second radiator 102 and the third radiator 103 form a radiator of a slot antenna 40. The first radiator 101 and the fourth radiator 104 form a radiator of a wire antenna 50.

In this embodiment, a length of the second radiator 102 is equal to a length of the third radiator 103, and both the length of the second radiator 102 and the length of the third radiator 103 are ¼ wavelength. The wavelength may be obtained through calculation based on operating frequencies f1 of the second radiator 102 and the third radiator 103. Specifically, wavelength of a radiation signal in the air may be calculated as follows: Wavelength=Speed of light/f1. The wavelength of the radiation signal in a medium may be calculated as follows: Wavelength=(Speed of light/√ε/f1, where ε is a relative dielectric constant of the medium. In this case, the radiator of the slot antenna 40 has good symmetry. It may be understood that, in an actual application, the length of the second radiator 102 is difficult to be totally equal to the length of the third radiator 103, and this structural imbalance may be compensated for by adjusting a matching circuit or the like.

A length of the first radiator 101 is equal to a length of the fourth radiator 104, and the length of the first radiator 101 and the length of the fourth radiator 104 are ¼ wavelength. The wavelength may be obtained through calculation based on operating frequencies f1 of the first radiator 101 and the fourth radiator 104. Specifically, wavelength of a radiation signal in the air may be calculated as follows: Wavelength=Speed of light/f1. The wavelength of the radiation signal in a medium may be calculated as follows: Wavelength=(Speed of light/√ε)/f1, where ε is a relative dielectric constant of the medium. In this case, a radiator of the wire antenna 50 is better. It may be understood that, in an actual application, the length of the first radiator 101 is difficult to be totally equal to the length of the fourth radiator 104, and this structural imbalance may be compensated for by adjusting a matching circuit or the like.

In another embodiment, the length of the second radiator 102 may be alternatively unequal to the length of the third radiator 103. The length of the first radiator 101 may also be unequal to the length of the fourth radiator 104.

Refer to FIG. 8 again. The first short bezel 123 may further include a second insulation segment 1237 and a third insulation segment 1239. The second insulation segment 1237 is connected to the first portion 1. The third insulation segment 1239 is connected to the fourth portion 6. The second insulation segment 1237 is configured to electrically isolate the first metal segment 1231 from another metal segment of the bezel 12. The third insulation segment 1239 is configured to electrically isolate the second metal segment 1233 from another metal segment of the bezel 12.

Second, the following specifically describes a symmetric feed manner with reference to related accompanying drawings.

Refer to FIG. 8 and FIG. 9 again. The slot antenna 40 includes a bridge structure 41. The bridge structure 41 is made of a conductive material, for example, a metal material. The bridge structure 41 is located within the bezel 12.

In this embodiment, the bridge structure 41 is disposed on the circuit board 30, and the bridge structure 41 is insulated from the ground plane of the circuit board 30. In an embodiment, a surface that is of the circuit board 30 and that faces the screen 20 is a ground plane. In this case, the bridge structure 41 is disposed on a surface that is of the circuit board 30 and that is away from the screen 20. In this way, the bridge structure 41 may be insulated from the ground plane of the circuit board 30. A structural form of the bridge structure 41 may be a flexible circuit board, a laser direct structuring (LDS) metal, an in-mold injection molding metal, or a printed circuit board cabling. In still another embodiment, a support is disposed on a surface that is of the circuit board 30 and that faces the screen 20. The support is made of an insulation material, such as plastic. In this case, the support is insulated from the ground plane of the circuit board 30. Then, the bridge structure 41 is disposed on the support. In this way, the bridge structure 41 may also be insulated from the ground plane of the circuit board 30.

In this embodiment, the bridge structure 41 is a symmetric pattern. For example, the bridge structure 41 is in a shape of "Π". In this case, symmetry of the bridge structure 41 is good, that is, symmetry of the slot antenna 40 is good. The bridge structure 41 has a simple structure and is easy to prepare. In another embodiment, the bridge structure 41 may alternatively be in an arc shape. In addition, the bridge structure 41 may also alternatively be in an asymmetric pattern shape.

In addition, an end of the bridge structure 41 is connected to the second radiator 102. In an embodiment, one end of the bridge structure 41 is connected to the second radiator 102 through a dome. The other end of the bridge structure 41 is connected to the third radiator 103. In an embodiment, the other end of the bridge structure 41 is connected to the third radiator 103 through a dome. In this case, a position at which the second radiator 102 is connected to the bridge structure 41 is a first feed point of the slot antenna 40. A position at which the third radiator 103 is connected to the bridge structure 41 is a second feed point of the slot antenna 40.

Refer to FIG. 8 and FIG. 9 again. The slot antenna 40 further includes a first feed circuit 42. A negative electrode of the first feed circuit 42 is grounded, that is, the negative electrode of the first feed circuit 42 is electrically connected to the ground plane of the circuit board 30. A positive electrode of the first feed circuit 42 is electrically connected to a middle portion of the bridge structure 41. FIG. 8 simply shows directions of the positive electrode and the negative electrode of the first feed circuit 42 by using arrows. An arrow direction is from the negative electrode to the positive electrode. It may be understood that this feed manner is a symmetric feed manner.

In an embodiment, the first feed circuit 42 includes a feed source and a capacitor. A negative electrode of the feed source is electrically connected to the ground plane of the circuit board 30. A positive electrode of the feed source is electrically connected to one side of the capacitor. The other side of the capacitor is electrically connected to the middle portion of the bridge structure 41. In other words, the capacitor is electrically connected to the positive electrode of the feed source and the middle portion of the bridge structure 41.

Second, the following specifically describes an anti-symmetric feed manner with reference to related accompanying drawings.

Refer to FIG. 8 and FIG. 9 again. The wire antenna 50 includes a first conductive segment 51, a third conductive segment 52, and a first matching circuit 56. The first conductive segment 51 and the third conductive segment 52 are both made of a conductive material, for example, a metal material. The first conductive segment 51, the third conductive segment 52, and the first matching circuit 56 are located within the bezel 12.

In addition, the first conductive segment 51 includes a first end 511 and a second end 512 disposed away from the first end 511. The first end 511 of the first conductive segment 51 is electrically connected to the ground plane of the circuit board 30, that is, the first end 511 is grounded. It may be understood that, for a manner in which the first end 511 is electrically connected to the ground plane of the circuit board 30, refer to the manner in which the first metal segment 1231 is electrically connected to the ground plane of the circuit board 30. Details are not described herein.

In addition, the second end 512 of the first conductive segment 51 is electrically connected to the third conductive segment 52 through the first matching circuit 56. It may be understood that the first matching circuit 56 is configured to match an antenna impedance. The first matching circuit 56 may include at least one circuit component. For example, the first matching circuit 56 may include at least one of a resistor, an inductor, or a capacitor that is used as a lumped element. For example, the first matching circuit 56 may include at least one of an inductor or a capacitor that is used as a distributed element. In another embodiment, the second end 512 may alternatively be directly electrically connected to the third conductive segment 52.

In addition, an end portion that is of the third conductive segment 52 and that is away from the first matching circuit 56 is connected to the first radiator 101. In an embodiment, an end portion that is of the third conductive segment 52 and that is away from the first matching circuit 56 is connected to the first radiator 101 through a dome. In this case, a position at which the first radiator 101 is connected to the third conductive segment 52 is the first feed point.

In this embodiment, the first conductive segment 51, the third conductive segment 52, and the first matching circuit 56 are disposed on the ground plane of the circuit board 30, and the first conductive segment 51, the third conductive segment 52, and the first matching circuit 56 are all insulated from the ground plane of the circuit board 30.

In an embodiment, a ground plane is disposed on a surface that is of the circuit board 30 and that faces the screen 20. In this case, a support is disposed on a surface that is of the circuit board 30 and that faces the screen 20. The support is made of an insulation material, such as plastic. Then, the first conductive segment 51 is disposed on the support. In addition, the third conductive segment 52 is disposed on a surface that is of the circuit board 30 and that is away from the screen 20. Further, a hollow region is disposed on the circuit board 30, and the first matching circuit 56 is disposed in the hollow region. It may be understood that, because the first conductive segment 51 and the third conductive segment 52 are located on two opposite surfaces of the circuit board 30 (that is, there is a height difference between the first conductive segment 51 and the third conductive segment 52 in a Z direction), FIG. 8 simply shows the third conductive segment 52 by using a solid line, the first conductive segment 51 is simply illustrated by using a dashed line. In this way, the first conductive segment 51, the third conductive segment 52, and the first matching circuit 56 may also be insulated from the ground plane of the circuit board 30. In addition, structural forms of the first conductive segment 51 and the third conductive segment 52 may be a flexible circuit board, a laser direct structuring metal, an in-mold injection molding metal, or a printed circuit board cabling.

In another embodiment, the first conductive segment 51, the third conductive segment 52, and the first matching circuit 56 are disposed on a surface that is of the circuit board 30 and that is away from the screen 20. A hollow region is disposed on the circuit board 30, so that the first end 511 of the first conductive segment 51 can be electrically connected to the ground plane of the circuit board 30 through the hollow region. In this way, the first conductive segment 51, the third conductive segment 52, and the first matching circuit 56 may all be insulated from the ground plane of the circuit board 30. In addition, structural forms of the first conductive segment 51 and the third conductive segment 52 may be a flexible circuit board, a laser direct structuring metal, an in-mold injection molding metal, or a printed circuit board cabling.

Refer to FIG. 4 and FIG. 5 again. The wire antenna 50 further includes a second conductive segment 53, a fourth conductive segment 54, and a second matching circuit 57. The second conductive segment 53 and the fourth conductive segment 54 are both made of a conductive material, for example, a metal material. The second conductive segment 53, the fourth conductive segment 54, and the second matching circuit 57 are located within the bezel 12, that is, in an accommodating space 13. In addition, for a disposition manner of the second conductive segment 53, the fourth conductive segment 54, and the second matching circuit 57, refer to a disposition manner of the first conductive segment 51, the third conductive segment 52, and the first matching circuit 56. Details are not described herein. In this case, there is a height difference between the second conductive segment 53 and the fourth conductive segment 54 in the Z direction.

In addition, the second conductive segment 53 includes a third end 531 and a fourth end 532 disposed away from the third end 531. The third end 531 of the second conductive segment 53 is electrically connected to the ground plane of the circuit board 30, that is, the first end 511 is grounded. It may be understood that, for a manner in which the third end 531 is electrically connected to the ground plane of the circuit board 30, refer to the manner in which the first metal segment 1231 is electrically connected to the ground plane of the circuit board 30. Details are not described herein.

In addition, the fourth end 532 of the second conductive segment 53 is electrically connected to the fourth conductive segment 54 through the second matching circuit 57. It may be understood that the second matching circuit 57 is configured to match an antenna impedance. The second matching circuit 57 may include at least one circuit component. For example, the second matching circuit 57 may include at least one of a resistor, an inductor, or a capacitor that is used as a lumped element. For example, the second matching circuit 57 may include at least one of an inductor or a capacitor that is used as a distributed element. In another embodiment, the fourth end 532 may alternatively be directly electrically connected to the fourth conductive segment 54.

In addition, an end that is of the fourth conductive segment 54 and that is away from the second conductive segment 53 is connected to the fourth radiator 104. In an embodiment, an end that is of the fourth conductive segment 54 and that is away from the second conductive segment 53 is connected to the fourth radiator 104 through a dome. In this case, a position at which the fourth radiator 104 is connected to the fourth conductive segment 54 is a second feed point.

In this embodiment, the first conductive segment 51 and the second conductive segment 53 are two symmetrical parallel conducting wires. In an embodiment, the first conductive segment 51 is in a "|" shape. The second conductive segment 53 is also in a "|" shape. In this case, the first conductive segment 51 and the second conductive segment 53 have good symmetry, that is, the wire antenna 50 has good structural symmetry. The first conductive segment 51 and the second conductive segment 53 are simple in structure and are easy to prepare. In another embodiment, the first conductive segment 51 may alternatively be in an arc shape. The second conductive segment 53 may also be in an arc shape. The first conductive segment 51 and the second conductive segment 53 may also be in an asymmetric pattern shape.

In this embodiment, the third conductive segment 52 and the fourth conductive segment 54 are in a symmetrical pattern shape. In an embodiment, the third conductive segment 52 is in a "⌈" shape. The fourth conductive segment 54 is in a "⌉" shape. In this case, the third conductive segment 52 and the fourth conductive segment 54 have good symmetry, that is, the wire antenna 50 has good structural symmetry. The third conductive segment 52 and the fourth conductive segment 54 are simple in structure and are easy to prepare. In another embodiment, the third conductive segment 52 may also be in an arc shape. The fourth conductive segment 54 may also be in an arc shape. The third conductive segment 52 and the fourth conductive segment 54 may also be in an asymmetric pattern shape.

In addition, the wire antenna 50 further includes a second feed circuit 55. A negative electrode of the second feed circuit 55 is electrically connected between the first end 511 and the second end 512 of the first conductive segment 51. A positive electrode of the second feed circuit 55 is electrically connected between the third end 531 and the fourth end 532 of the second conductive segment 53. In this embodiment, the negative electrode of the second feed circuit 55 is electrically connected to a middle position between the first end 511 and the second end 512. The positive electrode of the second feed circuit 55 is electrically connected to a middle position between the third end 531 and the fourth end 532. In this case, the structure of the wire antenna 50 has good symmetry. In another embodiment, the negative electrode of the second feed circuit 55 may alternatively deviate from the middle position between the first end 511 and the second end 512. The positive electrode of the second feed circuit 55 may alternatively deviate from the middle position between the third end 531 and the fourth end 532. In addition, FIG. 8 simply shows directions of the positive electrode and the negative electrode of the second feed circuit 55 by using arrows. An arrow direction is from the negative electrode to the positive electrode, that is, from left to right. It may be understood that this feed manner is an anti-symmetric feed manner. In addition, in another embodiment, when locations of the first metal segment 1231 and the second metal segment 1233 are exchanged, the positive electrode and the negative electrode of the second feed circuit 55 face from right to left.

It may be understood that, with reference to the foregoing and related accompanying drawings, this embodiment specifically describes the antenna structure including the slot antenna 40 and the wire antenna 50, and two feed manners of the antenna structure: a symmetric feed manner and an anti-symmetric feed manner. The following describes antenna performance of such an antenna structure in detail with reference to related accompanying drawings.

The following specifically describes specific parameters of some related components of the electronic device 100. Specifically, a thickness of the bezel 12 of the electronic device 100 is approximately 4 millimeters, and a width of the bezel 12 of the electronic device 100 is approximately 3 millimeters. A width of a clearance region between the bezel 12 of the electronic device 100 and the ground plane of the circuit board 30 is approximately 1 millimeter, that is, widths of the first gap 31 and the second gap 32 are both approximately 1 millimeter. A width of the first insulation segment 1232 is approximately 2 millimeters. A dielectric constant of an insulation material used by the first insulation segment 1232, the second insulation segment 1237, and the third insulation segment 1239 is 3.0, and a loss angle is 0.01. In addition, a dielectric constant of an insulation material filled in the first gap 31 and the second gap 32 is also 3.0, and a loss angle is also 0.01.

Figure 10:
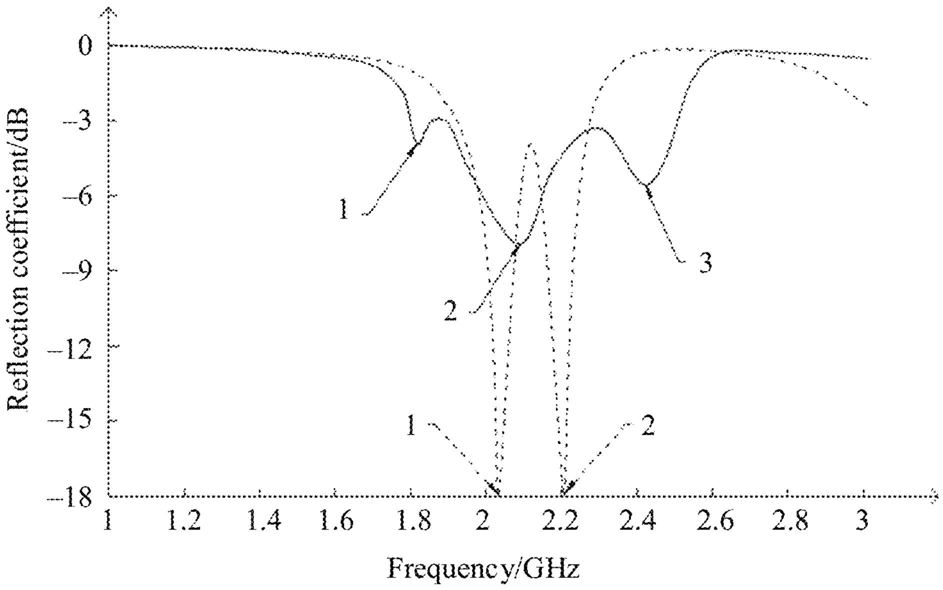
FIG. 10 is a curve graph of a reflection coefficient of the antenna structure shown in FIG. 9.

FIG. 10 is a curve graph of a reflection coefficient of the antenna structure shown in FIG. 9. In FIG. 10, a solid line represents a curve of a reflection coefficient of the antenna structure in an anti-symmetrical feed manner. A dashed line in FIG. 10 represents a curve of a reflection coefficient of the antenna structure in a symmetric feed manner. In FIG. 10, a horizontal coordinate represents a frequency (unit: GHz), and a vertical coordinate represents a reflection coefficient (unit: dB).

It can be seen from the solid line in FIG. 10 that the antenna structure may generate three resonance modes in the anti-symmetric feed manner, and resonance frequencies of the three resonance modes are separately near 1.84 GHz (a position indicated by a solid line arrow 1), near 2.07 GHz (a position indicated by a solid line arrow 2), and near 2.49 GHz (a position indicated by a solid line arrow 3). In addition, it can be learned from dashed lines in FIG. 10 that the antenna structure may generate two resonance modes in the symmetric feed manner. Resonance frequencies of the two resonance modes are respectively near 2.04 GHz (a position indicated by a dashed arrow 1) and near 2.21 GHz (a position indicated by a dashed arrow 2). It may be understood that a frequency band 0 GHz to 3 GHz is used as an example for description in this embodiment. Certainly, in another embodiment, a related parameter (for example, a length of the second radiator 102 of the slot antenna 40, a length of the third radiator 103 of the slot antenna 40, a length of the first radiator 101 of the wire antenna 50, or a length of the fourth radiator 104 of the wire antenna 50) is adjusted, therefore, in another frequency band (for example, 3 GHz to 6 GHz, 6 GHz to 8 GHz, or 8 GHz to 11 GHz), the antenna structure may alternatively generate five resonance modes, that is, generate five resonance frequencies.

It may be understood that, an antenna structure including the slot antenna 40 and the wire antenna 50 is disposed, and two feed manners are used, so that the antenna structure may be excited to generate five resonance modes. This implements that an antenna covers a plurality of frequency bands.

Figure 11:
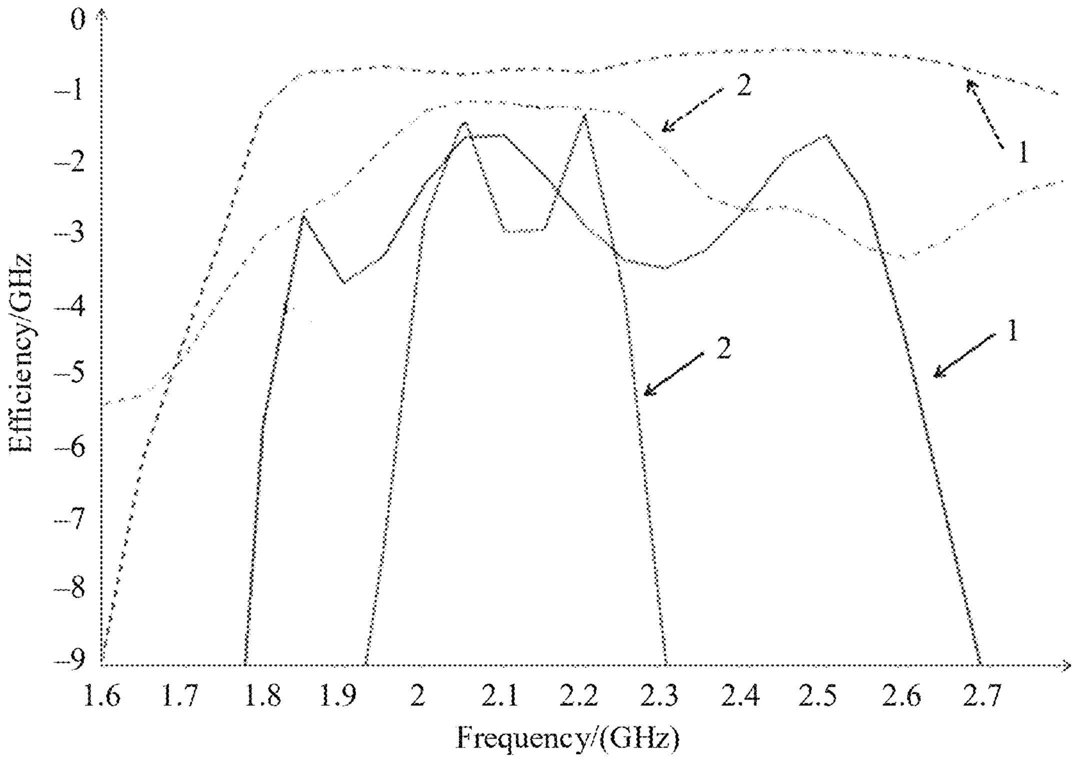
FIG. 11 is an efficiency curve graph of the antenna structure shown in FIG. 9.

In addition, FIG. 11 is an efficiency curve graph of the antenna structure shown in FIG. 9. In FIG. 11, a solid line 1 (a curve indicated by a solid line arrow 1) represents a system efficiency curve of the antenna structure in an anti-symmetric feed manner. In FIG. 11, a solid line 2 (a curve indicated by a solid line arrow 2) represents a system efficiency curve of the antenna structure in a symmetric feed manner. In FIG. 11, a dashed line 1 (a curve indicated by a dashed arrow 1) represents a radiation efficiency curve of the antenna structure in the anti-symmetric feed manner. In FIG. 11, a dashed line 2 (a curve indicated by a dashed arrow 2) represents a radiation efficiency curve of the antenna structure in the symmetric feed manner. In FIG. 11, a horizontal coordinate represents a frequency (unit: GHz), and a vertical coordinate represents efficiency (unit: dB). It can be learned from FIG. 11 that, an excitation resonance signal generated by the antenna structure in the anti-symmetric feed manner expands the bandwidth of the antenna structure. In addition, an excitation resonance signal generated by the antenna structure in the symmetric feed manner expands the bandwidth of the antenna structure. Therefore, antenna performance of the antenna structure is good.

Figure 12:
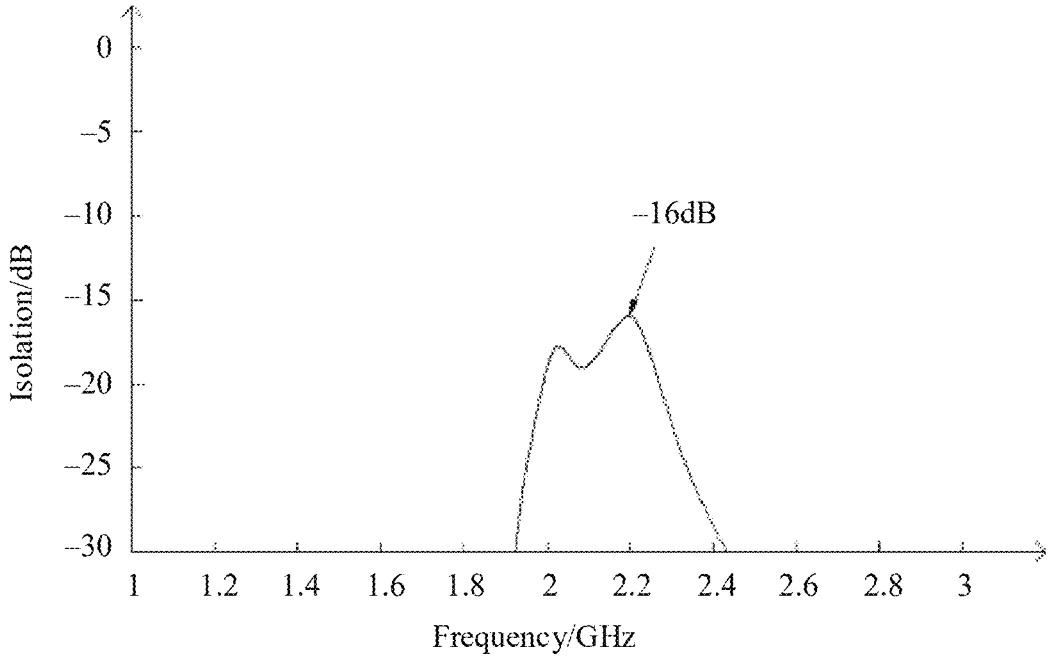
FIG. 12 is an isolation curve graph of the antenna structure shown in FIG. 9.

FIG. 12 is an isolation curve graph of the antenna structure shown in FIG. 9. In FIG. 12, a horizontal coordinate represents a frequency (unit: GHz), and a vertical coordinate represents efficiency (unit: dB). It can be learned from FIG. 12 that, isolation between an excitation resonance signal generated by the antenna structure in an anti-symmetric feed manner and an excitation resonance signal generated by the antenna structure in a symmetric feed manner may reach more than 16 dB (a position indicated by an arrow). Therefore, antenna performance of the antenna structure is good.

Figure 13A:
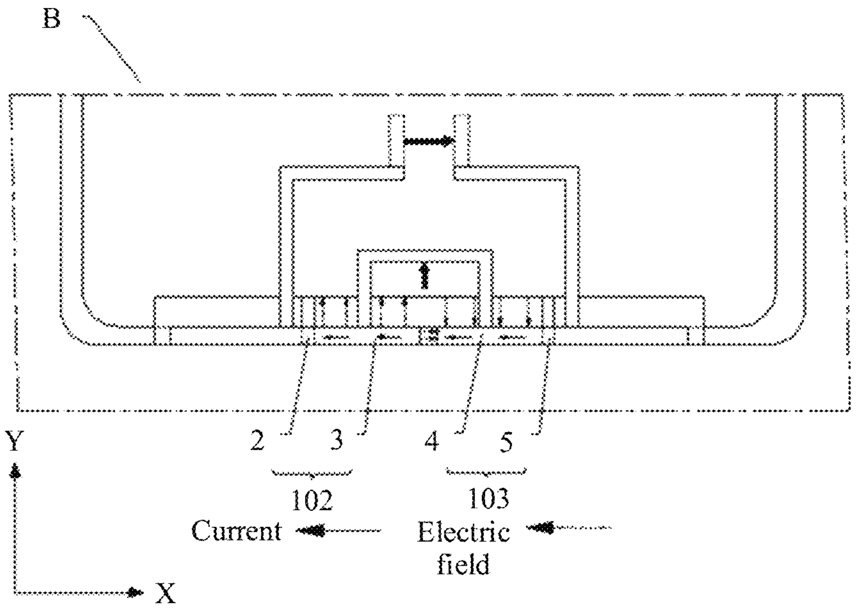
FIG. 13*a* is a schematic diagram of flow directions of a current and an electric field of the antenna structure shown in FIG. 9 under a signal with a frequency of 1.84 GHz.
Figure 13B:
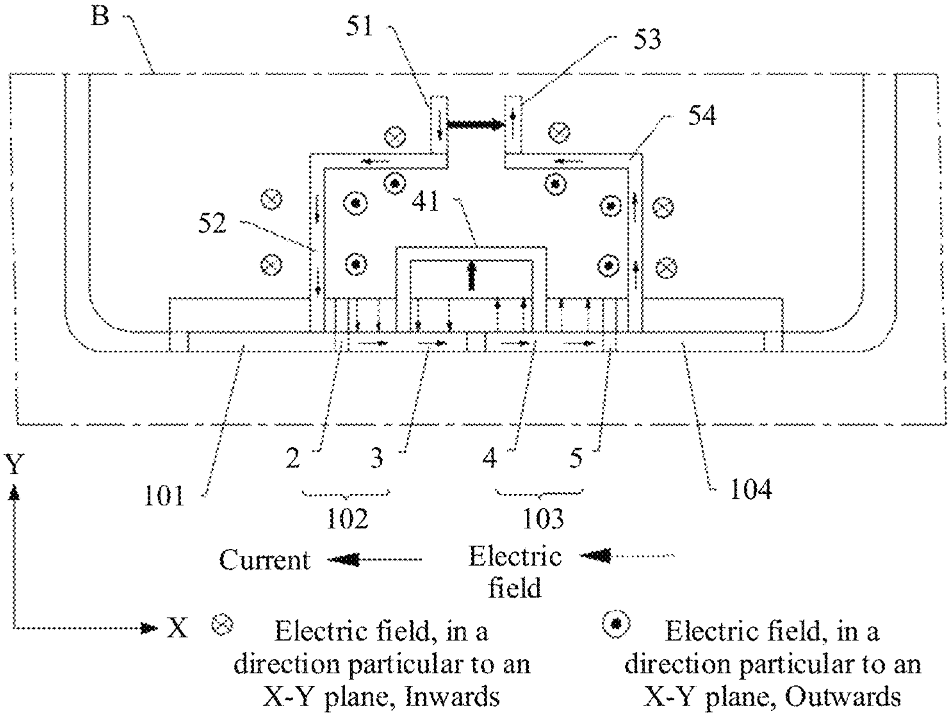
FIG. 13*b* is a schematic diagram of flow directions of another current and electric field of the antenna structure shown in FIG. 9 under a signal with a frequency of 2.07 GHz.
Figure 13C:
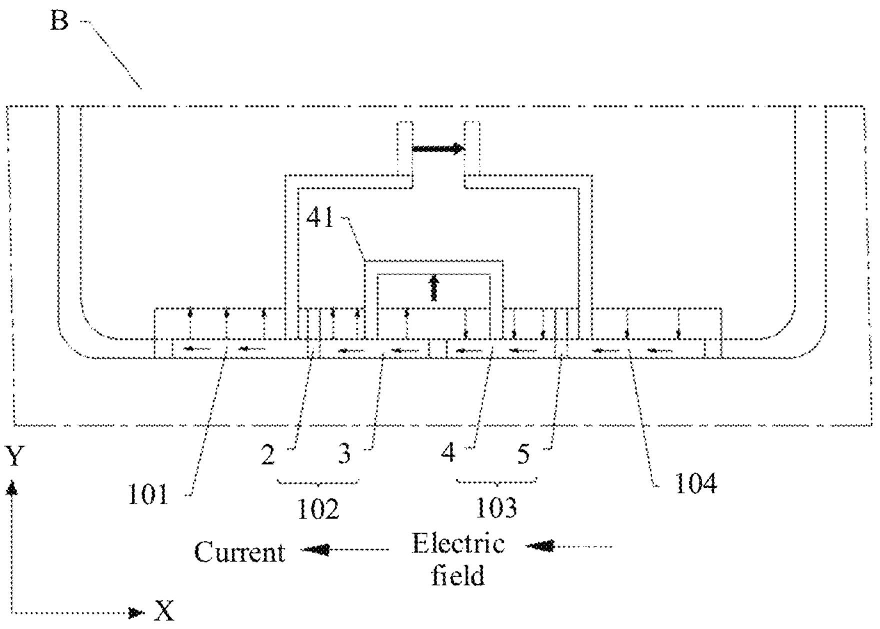
FIG. 13*c* is a schematic diagram of flow directions of still another current and electric field of the antenna structure shown in FIG. 9 under a signal with a frequency of 2.49 GHz.
Figure 13D:
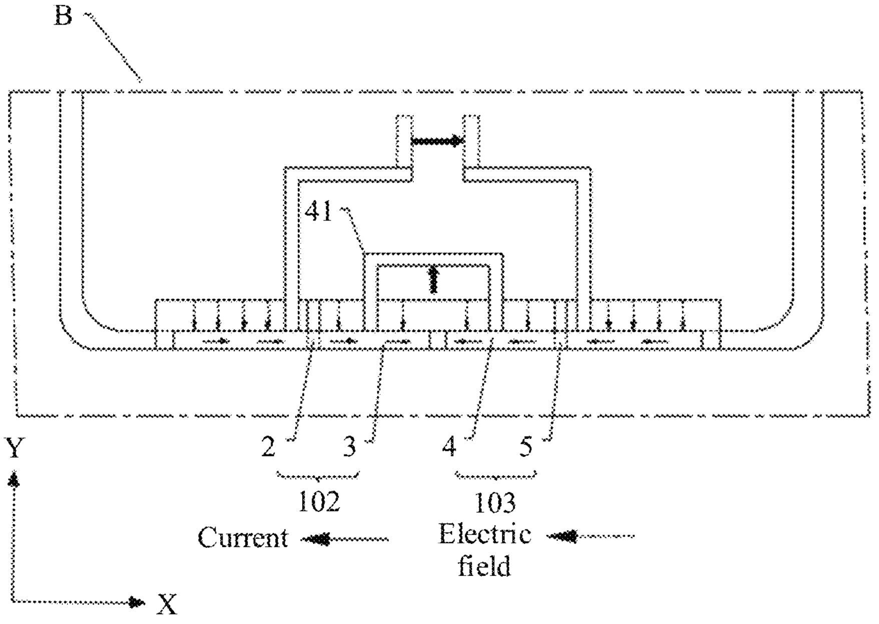
FIG. 13*d* is a schematic diagram of flow directions of yet another current and electric field of the antenna structure shown in FIG. 9 under a signal with a frequency of 2.04 GHz.
Figure 13E:
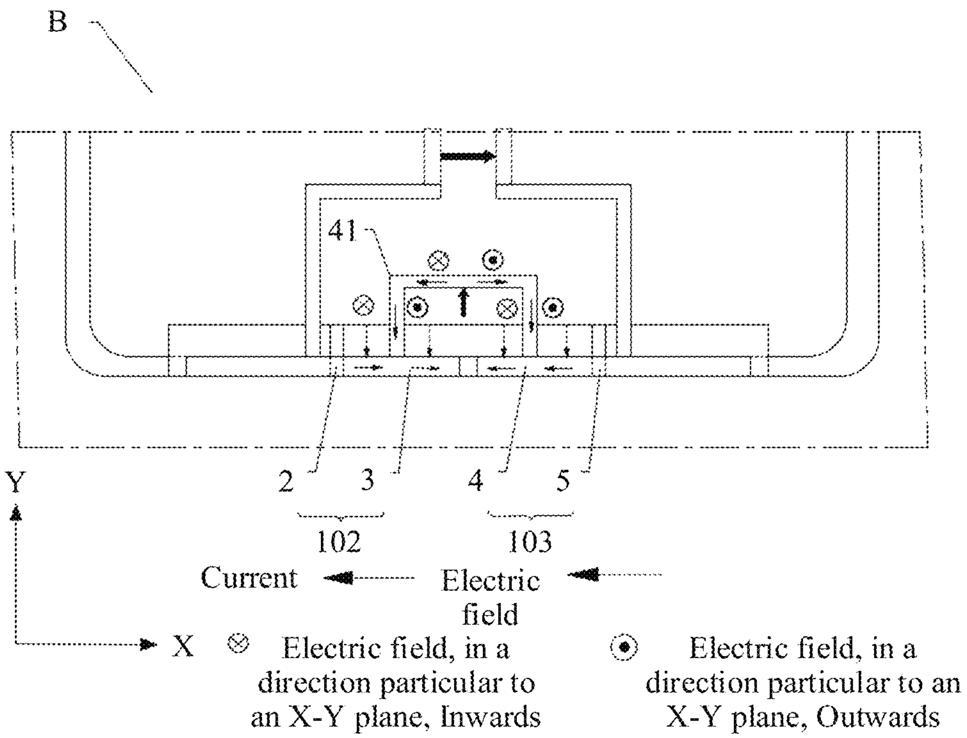
FIG. 13*e* is a schematic diagram of flow directions of still yet another current and electric field of the antenna structure shown in FIG. 9 under a signal with a frequency of 2.21 GHz.

With reference to FIG. 13*a* to FIG. 13*e*, the following specifically describes schematic diagrams of flow directions of a current and an electric field of an antenna structure at five resonance frequencies. FIG. 13*a* is a schematic diagram of flow directions of a current and an electric field of the antenna structure shown in FIG. 9 under a signal with a frequency of 1.84 GHz. FIG. 13*b* is a schematic diagram of flow directions of another current and electric field of the antenna structure shown in FIG. 9 under a signal with a frequency of 2.07 GHz. FIG. 13*c* is a schematic diagram of flow directions of still another current and electric field of the antenna structure shown in FIG. 9 under a signal with a frequency of 2.49 GHz. FIG. 13*d* is a schematic diagram of flow directions of yet another current and electric field of the antenna structure shown in FIG. 9 under a signal with a frequency of 2.04 GHz. FIG. 13*e* is a schematic diagram of flow directions of still yet another current and electric field of the antenna structure shown in FIG. 9 under a signal with a frequency of 2.21 GHz.

Refer to FIG. 13*a*. A first-type current is generated in the antenna structure. A current flow direction of the first-type current has two portions: One portion is a current that is transmitted from the ground end of the third radiator 103 to the open end of the third radiator 103, and the other portion is a current that is transmitted from the open end of the second radiator 102 to the ground end of the second radiator 102. In addition, directions of electric fields on respective sides of the second radiator 102 and the third radiator 103 are different.

Refer to FIG. 13*b*. A second-type current is generated in the antenna structure. A flow direction of the second-type current includes two portions: One portion is a current that flows along the first conductive segment 51, the third conductive segment 52, the ground end of the first radiator 101, and the second radiator 102, and the other portion is a current that flows along the third radiator 103, the fourth radiator 104, the fourth conductive segment 54, and the second conductive segment 53. The flow direction of the second-type current is roughly in a ring shape. In addition, directions of electric fields on respective sides of the second radiator 102 and the third radiator 103 are different. In addition, directions of electric fields on two sides of the first conductive segment 51 and the third conductive segment 52 are also opposite. Directions of electric fields on two sides of the fourth conductive segment 54 and the second conductive segment 53 are also opposite.

Refer to FIG. 13*c*. A third-type current is generated in the antenna structure. The flow direction of the third-type current has two portions: One portion is a current that flows along the open end of the fourth radiator 104, the ground end of the third radiator 103, and the open end of the third radiator 103, and the other portion is a current that flows along the open end of the second radiator 102, the ground end of the second radiator 102, and the open end of the first radiator 101. In addition, directions of electric fields on a side of the first radiator 101, a side of the second radiator 102, a side of the third radiator 103 and a side of the fourth radiator 104 are the same. In addition, directions of electric fields on respective sides of the first radiator 101, the second radiator 102, the third radiator 103, and the fourth radiator 104 are different.

Refer to FIG. 13*d*. A fourth-type current is generated in the antenna structure. A specific flow direction of the fourth-type current includes two portions. One portion is a current that flows along the open end of the fourth radiator 104, the ground end of the third radiator 103, and the open end of the third radiator 103, and the other portion is a current that flows along the open end of the first radiator 101, the ground end of the first radiator 101, and the open end of the second radiator 102. In addition, directions of electric fields on respective sides of the first radiator 101, the second radiator 102, the third radiator 103, and the fourth radiator 104 are the same.

Refer to FIG. 13*e*. A fifth-type current is generated in the antenna structure. A specific flow direction of the fifth-type current includes four portions. A first portion is a current that flows from the feed end of the bridge structure 41 to the second radiator 102, and a second portion is a current that flows from the ground end of the second radiator 102 to the open end of the second radiator 102. A third portion is a current that flows from the feed end of the bridge structure 41 to the third radiator 103. A fourth portion is a current that flows from the open end of the third radiator 103 to the ground end of the third radiator 103. In addition, directions of electric fields on respective sides of the second radiator 102 and the third radiator 103 are the same.

Figure 13F:
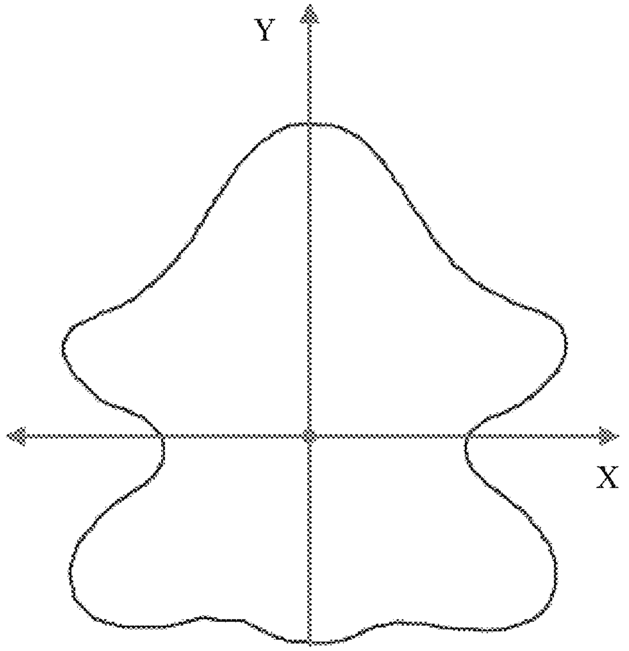
FIG. 13*f* is a schematic diagram of a radiation direction of the antenna structure shown in FIG. 9 under a signal with a frequency of 1.84 GHz.
Figure 13G:
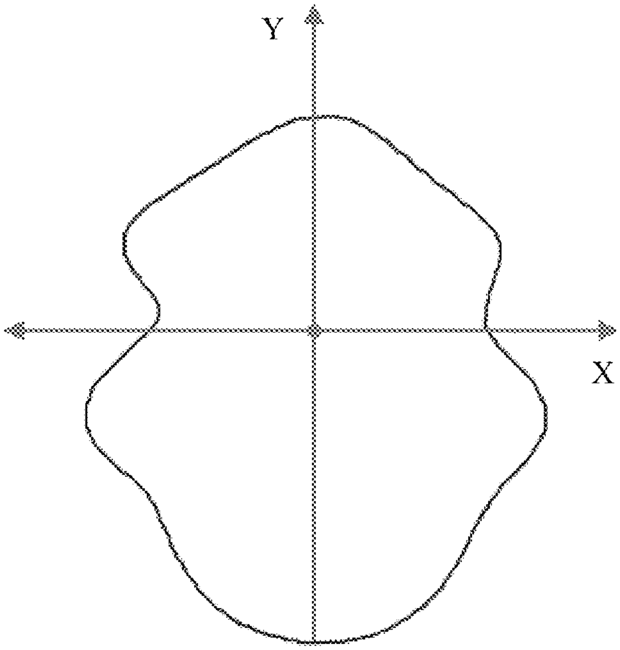
FIG. 13*g* is a schematic diagram of another radiation direction of the antenna structure shown in FIG. 9 under a signal with a frequency of 2.07 GHz.
Figure 13H:
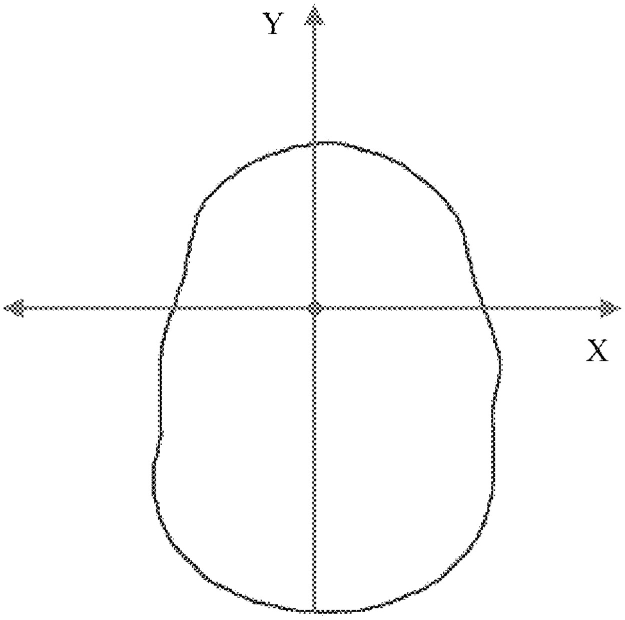
FIG. 13*h* is a schematic diagram of still another radiation direction of the antenna structure shown in FIG. 9 under a signal with a frequency of 2.49 GHz.
Figure 13I:
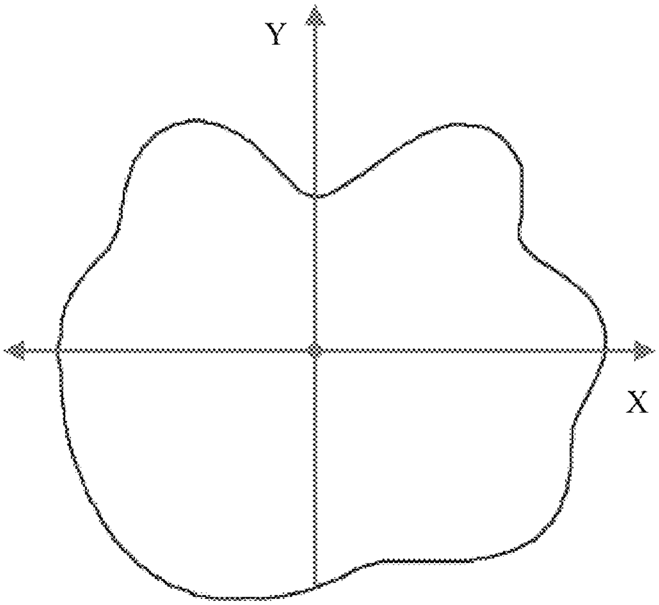
FIG. 13*i* is a schematic diagram of yet another radiation direction of the antenna structure shown in FIG. 9 under a signal with a frequency of 2.04 GHz.
Figure 13J:
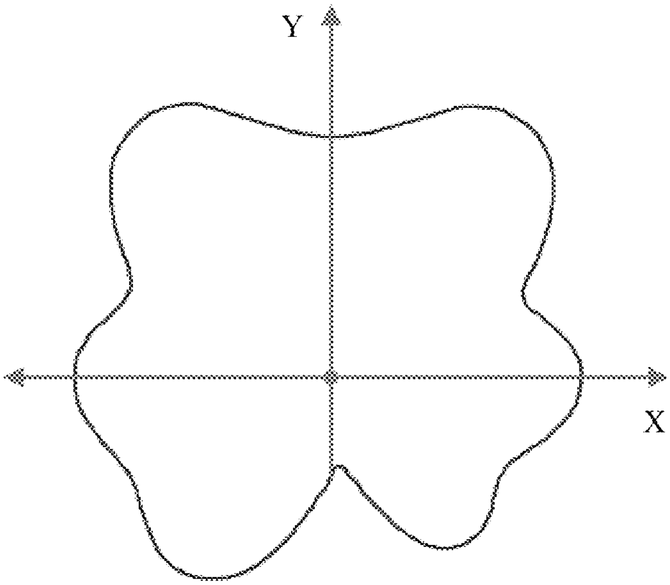
FIG. 13*j* is a schematic diagram of still yet another radiation direction of the antenna structure shown in FIG. 9 under a signal with a frequency of 2.21 GHz.

The following specifically describes schematic diagrams of radiation directions of an antenna structure at five resonance frequencies with reference to FIG. 13*f* to FIG. 13*j*. FIG. 13*f* is a schematic diagram of a radiation direction of the antenna structure shown in FIG. 9 under a signal with a frequency of 1.84 GHz. FIG. 13*g* is a schematic diagram of another radiation direction of the antenna structure shown in FIG. 9 under a signal with a frequency of 2.07 GHz. FIG. 13*h* is a schematic diagram of still another radiation direction of the antenna structure shown in FIG. 9 under a signal with a frequency of 2.49 GHz. FIG. 13*i* is a schematic diagram of yet another radiation direction of the antenna structure shown in FIG. 9 under a signal with a frequency of 2.04 GHz. FIG. 13*j* is a schematic diagram of still yet another radiation direction of the antenna structure shown in FIG. 9 under a signal with a frequency of 2.21 GHz.

Refer to FIG. 13*f* to FIG. 13*h*. An antenna signal generated by the antenna structure in FIG. 13*f* to FIG. 13*h* in an anti-symmetric feed manner has strong radiation intensity in a radiation direction as a Y-axis direction, and has weak radiation intensity in a radiation direction as an X-axis direction. To be specific, a common mode slot antenna with a frequency of 1.84 GHz has strong radiation in the Y-axis direction, a common mode slot antenna with a frequency of 2.07 GHz has strong radiation in the Y-axis direction, and a differential mode wire antenna with a frequency of 2.49 GHz has strong radiation in the Y-axis direction.

Refer to FIG. 13*i* to FIG. 13*j*. An antenna signal generated by the antenna structure in FIG. 13*i* to FIG. 13*j* in a symmetric feed manner has strong radiation intensity in a radiation direction as a Y-axis direction, and has weak radiation intensity in a radiation direction as an X-axis direction. To be specific, a common mode wire antenna with a frequency of 2.04 GHz has strong radiation in the X-axis direction, and a differential mode slot antenna with a frequency of 2.21 GHz has strong radiation in the X-axis direction.

In addition, it can be learned from FIG. 13*f* to FIG. 13*j* that in a same frequency band (for example, 0 GHz to 3 GHz in this embodiment), an excitation resonance signal generated by the antenna structure in the anti-symmetric feed manner differs greatly from an excitation resonance signal generated by the antenna structure in the symmetric feed manner in terms of directions. In this case, a radiation range of the antenna structure is wide.

In addition, it can be calculated, based on radiation patterns of two antennas in FIG. 13*f* to FIG. 13*j*, that ECCs of antenna signals generated in the anti-symmetric feed manner and antenna signals generated in the symmetric feed manner are both less than 0.1. In other words, the ECC of the antenna structure in this embodiment is small.

In this embodiment, an antenna structure including the slot antenna 40 and the wire antenna 50 is disposed, and two feed manners are used, so that the antenna structure may be excited to generate four antenna resonance modes. A differential mode wire antenna has two resonance modes. This implements that an antenna covers a plurality of frequency bands.

Figure 14:
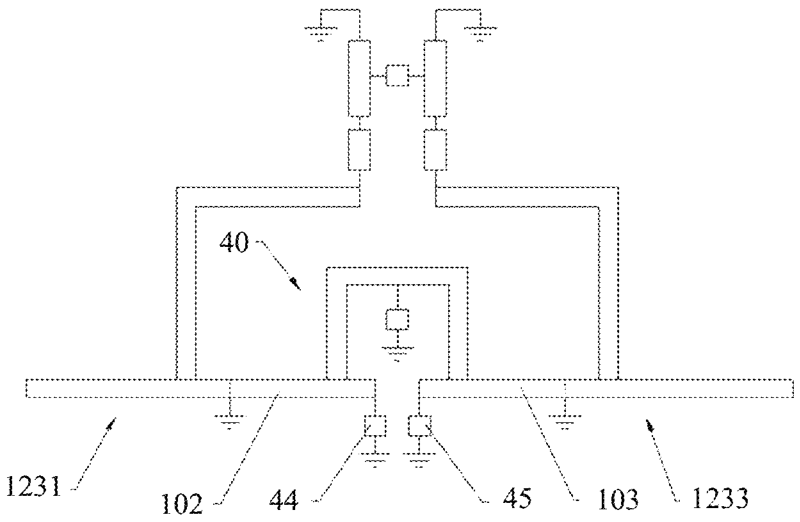
FIG. 14 is a schematic diagram of another embodiment of an antenna structure of the electronic device shown in FIG. 8.

In addition, isolation between an excitation resonance signal generated by the antenna structure in the anti-symmetric feed manner and an excitation resonance signal generated by the antenna structure in the symmetric feed manner may reach more than 16 dB, so that antenna performance of the antenna structure is good In Extended Embodiment 1, technical content that is the same as that in the first embodiment is not described again. FIG. 14 is a schematic diagram of another embodiment of an antenna structure of the electronic device shown in FIG. 8. The slot antenna 40 further includes a first tuning circuit 44 and a second tuning circuit 45. A portion of the first tuning circuit 44 is electrically connected to an end portion that is of the first metal segment 1231 and that faces the second metal segment 1233, and a portion of the first tuning circuit 44 is grounded. In other words, the open end of the second radiator 102 is grounded through the first tuning circuit 44. The first tuning circuit 44 is configured to adjust an electrical length of the second radiator 102. A portion of the second tuning circuit 45 is electrically connected to an end portion that is of the second metal segment 1233 and that faces the first metal segment 1231, and a portion of the second tuning circuit 45 is grounded. In other words, the open end of the third radiator 103 is grounded through the second tuning circuit 45. The second tuning circuit 45 is configured to adjust an electrical length of the third radiator 103. In an embodiment, the first tuning circuit 44 is a capacitor. In this case, the electrical length of the second radiator 102 may be effectively adjusted by setting an operating parameter of the capacitor, so that when the electrical length of the second radiator 102 is reduced, and the slot antenna 40 may be miniaturized. In addition, the second tuning circuit 45 may also be a capacitor.

Figure 15:
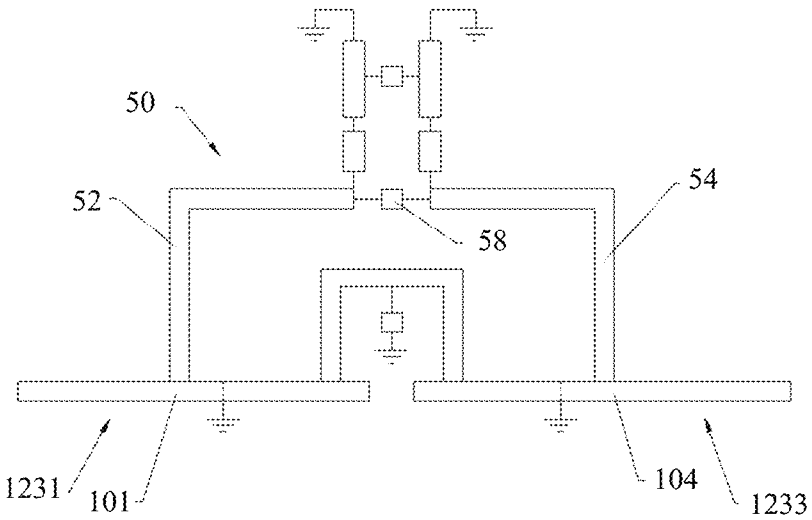
FIG. 15 is a schematic diagram of still another embodiment of an antenna structure of the electronic device shown in FIG. 8.

In Extended Embodiment 2, technical content that is the same as that in the first embodiment is not described again. FIG. 15 is a schematic diagram of still another embodiment of an antenna structure of the electronic device shown in FIG. 8. The wire antenna 50 further includes a third tuning circuit 58. The third tuning circuit 58 is electrically connected between an end portion that is away from the first metal segment 1231 and that is of the third conductive segment 52 and an end portion that is of the fourth conductive segment 54 and that is away from the second metal segment 1233. The third tuning circuit 58 is configured to adjust an electrical length of the first radiator 101 and an electrical length of the fourth radiator 104. For example, the third tuning circuit 58 is a capacitor. The capacitor is electrically connected between the third conductive segment 52 and the fourth conductive segment 54. In this case, the electrical length of the first radiator 101 and the electrical length of the fourth radiator 104 may be reduced by adjusting a parameter of the capacitor, so that when the electrical length of the first radiator 101 and the electrical length of the fourth radiator 104 are reduced, and the wire antenna 50 may be miniaturized.

It may be understood that, the antenna structure in this embodiment may also include the first tuning circuit 44 and the second tuning circuit 45 of the antenna structure in Extended Embodiment 1. For details, refer to Extended Embodiment 1.

In Extended Embodiment 3, technical content that is the same as that in the first embodiment is not described again: The bezel 12 is made of an insulation material. In this case, the first short bezel 123 is also made of an insulation material. In this case, the first metal segment 1231, the first insulation segment 1232, and the second metal segment 1233 are successively formed on an inner side of the first short bezel 123. Structural forms of the first metal segment 1231 and the second metal segment 1233 may be a flexible circuit board, a laser direct structuring (LDS) metal, an in-mold injection molding metal, or a printed circuit board cabling. In addition, the first insulation segment 1232 may be formed by filling a gap between the first metal segment 1231 and the second metal segment 1233 with an insulation material. For example, the insulation material is a material such as polymer, glass, or ceramic, or a combination of these materials. In another embodiment, the first insulation segment 1232 may alternatively be a gap, that is, the gap is not filled with an insulation material.

In a second embodiment, technical content that is the same as that in the first embodiment is not described again. Another antenna structure including a slot antenna and a wire antenna is disposed, and two feed manners are used, so that the antenna structure is excited to generate four antenna modes: a common mode slot antenna, a differential mode slot antenna, a common mode wire antenna, and a differential mode wire antenna. The common mode wire antenna has two resonance modes. The common mode slot antenna also has two resonance modes. In this way, in this embodiment, an antenna structure including the slot antenna 40 and the wire antenna 50 may be excited to generate a plurality of resonance modes, so that the antenna may cover a plurality of frequency bands.

This embodiment is described by using an example in which a radiator of an antenna structure including a slot antenna and a wire antenna is a portion of the first short bezel 123. In another embodiment, a radiator of an antenna structure including a slot antenna and a wire antenna may alternatively be a portion of the first long bezel 121, a portion of the second long bezel 122, or a portion of the second short bezel 124.

First, a structure of a radiator of a slot antenna and a structure of a radiator of a wire antenna are described in detail with reference to related accompanying drawings.

Figure 16:
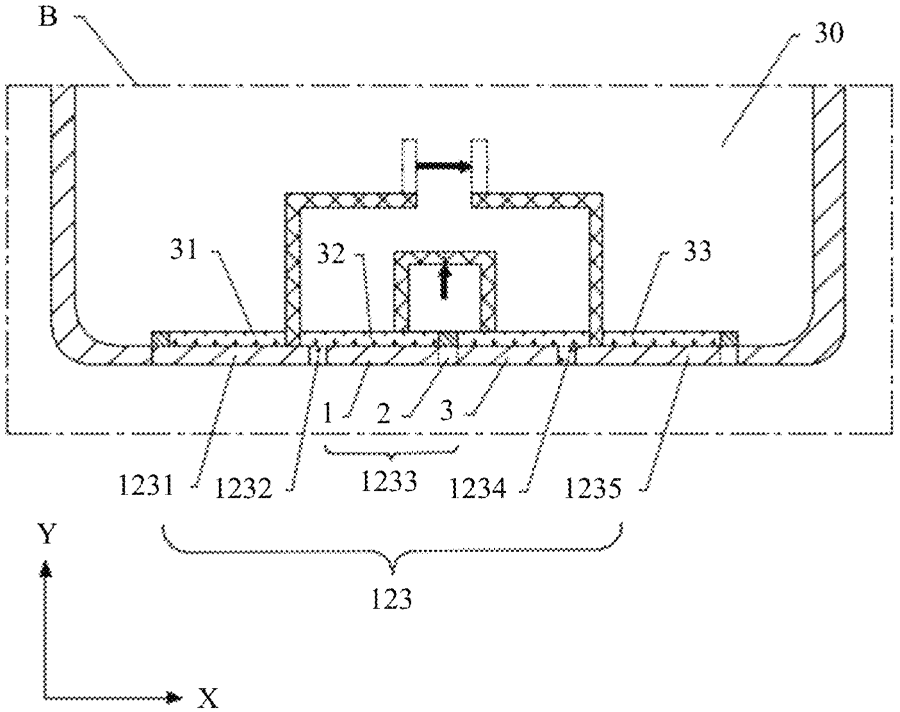
FIG. 16 is an enlarged schematic diagram of another embodiment at B of the electronic device shown in FIG. 7.

FIG. 16 is an enlarged schematic diagram of another embodiment at B of the electronic device shown in FIG. 7.

The first short bezel 123 includes a first metal segment 1231, a first insulation segment 1232, a second metal segment 1233, a second insulation segment 1234, and a third metal segment 1235 that are successively connected. In other words, the first insulation segment 1232 is located between the first metal segment 1231 and the second metal segment 1233. The second insulation segment 1234 is located between the second metal segment 1233 and the third metal segment 1235.

In addition, the second metal segment 1233 includes a first portion 1, a first ground portion 2, and a second portion 3. The first portion 1 is connected to the first insulation segment 1232. The second portion 3 is connected to the second insulation segment 1234. It may be understood that a fourth gap is formed between the first metal segment 1231 and the first portion 1. The first insulation segment 1232 may be formed by filling the fourth gap with an insulation material. For example, the insulation material may be a material such as polymer, glass, or ceramic, or a combination of these materials. In another embodiment, the fourth gap may be filled with air, that is, the fourth gap is not filled with any insulation material. In addition, a fifth gap is formed between the second portion 3 and the third metal segment 1235. The second insulation segment 1234 may be formed by filling the fifth gap with an insulation material. For example, the insulation material may be a material such as polymer, glass, or ceramic, or a combination of these materials.

In addition, for a grounding manner of the first ground portion 2 in this embodiment, refer to the grounding manner of the first ground portion 2 in the first embodiment, and details are not described herein again. In addition, an end portion that is of the first metal segment 1231 and that is away from the first insulation segment 1232 is grounded. An end portion that is of the third metal segment 1235 and that is away from the second insulation segment 1234 is grounded. For a grounding manner of the first metal segment 1231 and a grounding manner of the third metal segment 1235, refer to the grounding manner of the first ground portion 2 in the first embodiment, and details are not described herein again.

In addition, a first gap 31 is disposed between the first metal segment 1231 and the ground plane of the circuit board 30. The first gap 31 connects the first metal segment 1231 and the first portion 1 to form a fourth gap, and the second portion 3 and the third metal segment 1235 to form a fifth gap. In an embodiment, the first gap 31 may be filled with an insulation material. For example, the first gap 31 may be filled with a material such as polymer, glass, or ceramic, or a combination of these materials. In another embodiment, the first gap 31 may be filled with air, that is, the first gap 31 is not filled with any insulation material.

In addition, a second gap 32 is disposed between the second metal segment 1233 and the ground plane of the circuit board 30. The second gap 32 is connected to the first gap 31. The second gap 32 connects the first metal segment 1231 and the first portion 1 to form a fourth gap, and the second portion 3 and the third metal segment 1235 to form a fifth gap. For a disposition manner of the second gap 32, refer to the disposition manner of the first gap 31. Details are not described herein.

In addition, a third gap 33 is disposed between the third metal segment 1235 and the ground plane of the circuit board 30. The third gap 33 is connected to the first gap 31 and the second gap 32. The third gap 33 is connected to the first gap 31. The second gap 32 connects the first metal segment 1231 and the first portion 1 to form a fourth gap, and the second portion 3 and the third metal segment 1235 to form a fifth gap. For a disposition manner of the third gap 33, refer to the disposition manner of the first gap 31. Details are not described herein.

Figure 17:
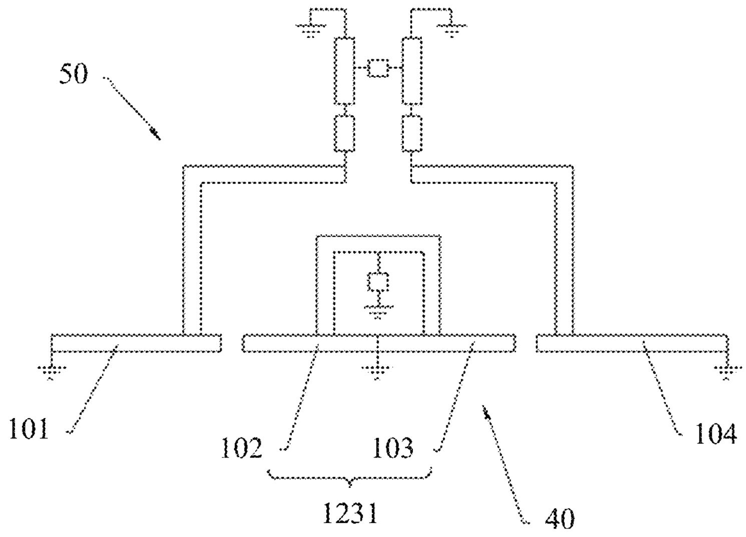
FIG. 17 is a schematic diagram of an embodiment of an antenna structure of the electronic device shown in FIG. 16.

Refer to FIG. 17, with reference to FIG. 16, FIG. 17 is a schematic diagram of an embodiment of an antenna structure of the electronic device shown in FIG. 16. The first portion 1 and the first ground portion 2 form the second radiator 102. The second portion 3 and the first ground portion 2 form the third radiator 103. The second radiator 102 and the third radiator 103 form a radiator of the wire antenna 50.

In addition, the first metal segment 1231 forms the first radiator 101. The third metal segment 1235 forms the fourth radiator 104. The first radiator 101 and the fourth radiator 104 form a radiator of the slot antenna 40.

Second, for a feed manner of the wire antenna 50 in this embodiment, refer to the feed manner of the slot antenna 40 in the first embodiment. Details are not described herein.

In addition, for a feed manner of the slot antenna 40 in this embodiment, refer to the feed manner of the wire antenna 50 in the first embodiment. Details are not described herein.

In this embodiment, a length of the second radiator 102 is equal to a length of the third radiator 103, and both the length of the second radiator 102 and the length of the third radiator 103 are ¼ wavelength. Wavelength 1 may be obtained through calculation based on operating frequencies f1 of the second radiator 102 and the third radiator 103. Specifically, the wavelength 1 of a radiation signal in the air may be calculated as follows: Wavelength=Speed of light/f1. The wavelength 1 of the radiation signal in a medium may be calculated as follows: Wavelength=(Speed of light/$\sqrt{\varepsilon}$)/f1, where ε is a relative dielectric constant of the medium.

A length of the first radiator 101 is equal to a length of the fourth radiator 104, and the length of the first radiator 101 and the length of the fourth radiator 104 are ¼ wavelength. The wavelength 1 may be obtained through calculation based on operating frequencies f1 of the first radiator 101 and the fourth radiator 104. Specifically, the wavelength 1 of a radiation signal in the air may be calculated as follows: Wavelength=Speed of light/f1. The wavelength 1 of the radiation signal in a medium may be calculated as follows: Wavelength=(Speed of light/$\sqrt{\varepsilon}$)/f1, where ε is a relative dielectric constant of the medium.

In another embodiment, the length of the second radiator 102 may be alternatively unequal to the length of the third radiator 103. The length of the first radiator 101 may also be unequal to the length of the fourth radiator 104.

The foregoing specifically describes an antenna structure including the wire antenna 50 and the slot antenna 40, and two feed manners of the antenna structure: a symmetric feed manner and an anti-symmetric feed manner. The following describes antenna performance of such an antenna structure in detail with reference to related accompanying drawings.

In addition, the following specifically describes specific parameters of some related components of the electronic device 100. A thickness of the bezel 12 of the electronic device 100 is approximately 4 millimeters, and a width of the bezel 12 of the electronic device 100 is approximately 3 millimeters. A width of a clearance region between the bezel 12 of the electronic device 100 and the ground plane of the circuit board 30 is approximately 1 millimeter, that is, widths of the first gap 31, the second gap 32, and the third gap 33 are all approximately 1 millimeter. A width of the first insulation segment 1232 and a width of the second insulation segment 1234 are approximately 2 millimeters. A dielectric constant of an insulation material used by the first insulation segment 1232 and the second insulation segment 1234 is 3.0, and a loss angle is 0.01. In addition, a dielectric constant of an insulation material filled in the first gap 31, the second gap 32, and the third gap 33 is also 3.0, and a loss angle is also 0.01.

Figure 18:
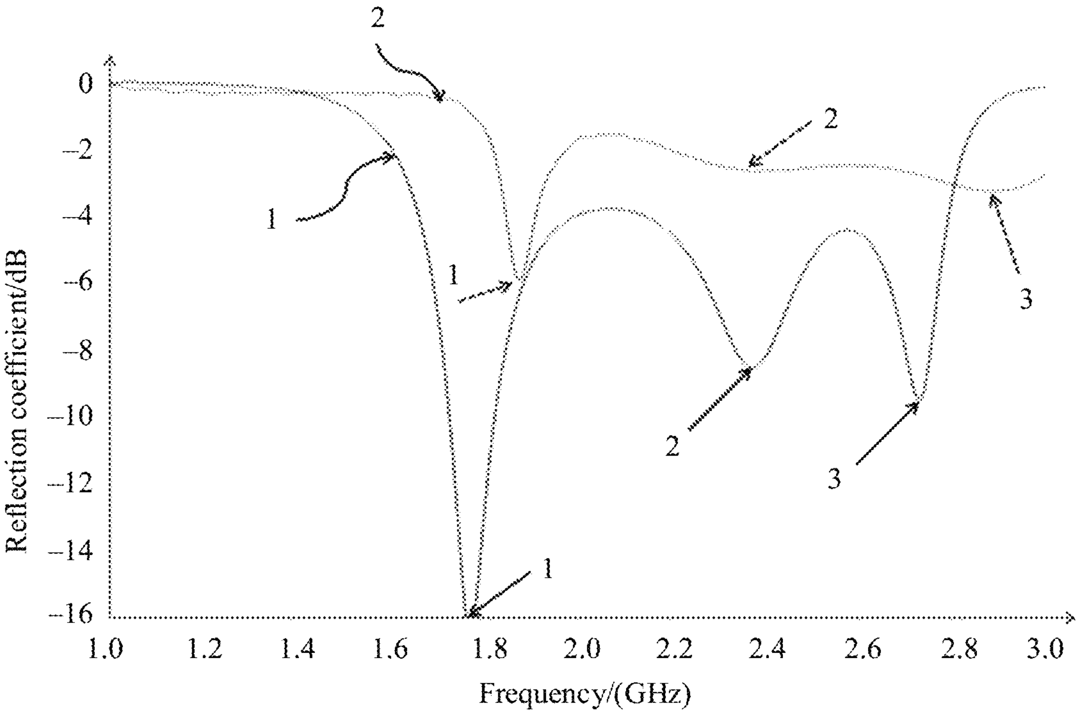

FIG. 18 is a curve graph of a reflection coefficient of the antenna structure shown in FIG. 17. In FIG. 18, a curve indicated by a curve arrow 1 represents a curve of a reflection coefficient of the antenna structure in an anti-symmetrical feed manner. A curve indicated by a curve arrow 2 in FIG. 18 is a reflection coefficient of the antenna structure in a symmetric feed manner. In FIG. 18, a horizontal coordinate represents a frequency (unit: GHz), and a vertical coordinate represents a reflection coefficient (unit: dB).

It can be learned from a curve indicated by the curve arrow 1 in FIG. 18 that the antenna structure may generate three resonance modes in the anti-symmetric feed manner, and resonance frequencies of the three resonance modes are separately near 1.75 GHz (a position indicated by a solid line arrow 1), near 2.36 GHz (a position indicated by a solid line arrow 2), and near 2.79 GHz (a position indicated by a solid line arrow 3). In addition, it can be learned from the curve indicated by the curve arrow 2 in FIG. 18 that the antenna structure may generate three resonance modes in the symmetric feed manner. Resonance frequencies of the three resonance modes are respectively near 1.87 GHz (a position indicated by a dashed arrow 1), near 2.36 GHz (a position indicated by a dashed arrow 2), and near 2.87 GHz (a position indicated by a dashed arrow 3). It may be understood that a frequency band 0 GHz to 3 GHz is used as an example for description in this embodiment. Certainly, in another embodiment, a related parameter (for example, a length of the second radiator 102 of the wire antenna 50, a length of the third radiator 103 of the wire antenna 50, a length of the first radiator 101 of the slot antenna 40, or a length of the fourth radiator 104 of the wire antenna 50) is adjusted, therefore, in another frequency band (for example, 3 GHz to 6 GHz, 6 GHz to 8 GHz, or 8 GHz to 11 GHz), the antenna structure may alternatively generate six resonance modes, that is, generate six resonance frequencies.

In this embodiment, an antenna structure including the slot antenna 40 and the wire antenna 50 is disposed, and two feed manners are used, so that the antenna structure is excited to generate six resonance modes. This implements that an antenna covers a plurality of frequency bands.

Figure 19:
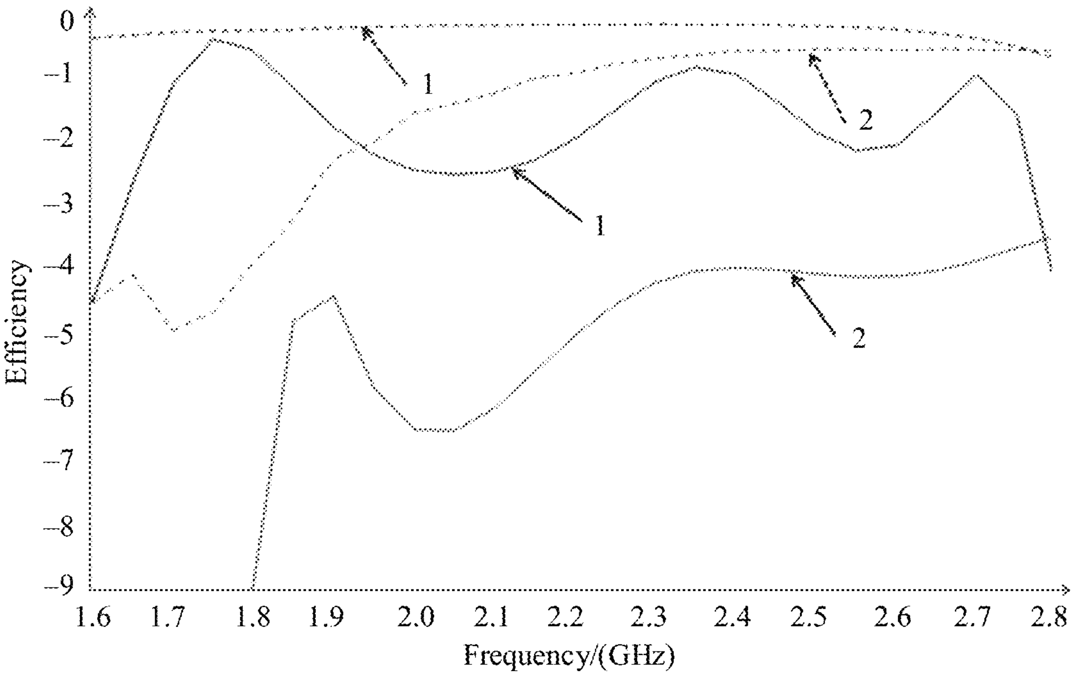
FIG. 19 is an efficiency curve graph of the antenna structure shown in FIG. 17.

FIG. 19 is an efficiency curve graph of the antenna structure shown in FIG. 17. In FIG. 19, a solid line 1 (a curve indicated by a solid line arrow 1) represents a system efficiency curve of the antenna structure in an anti-symmetric feed manner. In FIG. 19, a solid line 2 (a curve indicated by a solid line arrow 2) represents a system efficiency curve of the antenna structure in a symmetric feed manner. In FIG. 19, a dashed line 1 (a curve indicated by a dashed arrow 1) represents a radiation efficiency curve of the antenna structure in the anti-symmetric feed manner. In FIG. 19, a dashed line 2 (a curve indicated by a dashed arrow 2) represents a radiation efficiency curve of the antenna structure in the symmetric feed manner. In FIG. 19, a horizontal coordinate represents a frequency (unit: GHz), and a vertical coordinate represents efficiency (unit: dB). It can be learned from FIG. 19 that, an excitation resonance signal generated by the antenna structure in the anti-symmetric feed manner expands the bandwidth of the antenna structure. In addition, an excitation resonance signal generated by the antenna structure in the symmetric feed manner expands the bandwidth of the antenna structure. Therefore, antenna performance of the antenna structure is good.

Figure 20:
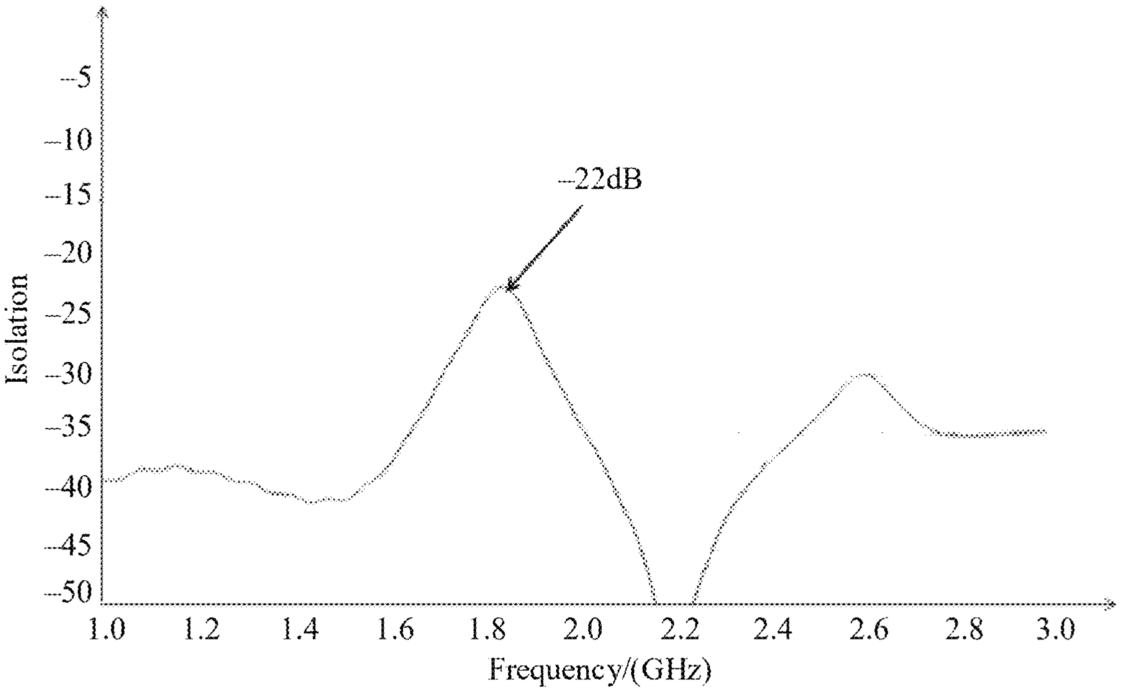
FIG. 20 is an isolation curve graph of the antenna structure shown in FIG. 17.

FIG. 20 is an isolation curve graph of the antenna structure shown in FIG. 17. In FIG. 20, a horizontal coordinate represents a frequency (unit: GHz), and a vertical coordinate represents efficiency (unit: dB). It can be learned from FIG. 20 that, isolation between an excitation resonance signal generated by the antenna structure in an anti-symmetric feed manner and an excitation resonance signal generated by the antenna structure in a symmetric feed manner may reach more than 22 dB (a position indicated by an arrow). Therefore, antenna performance of the antenna structure is good.

Figure 21A:
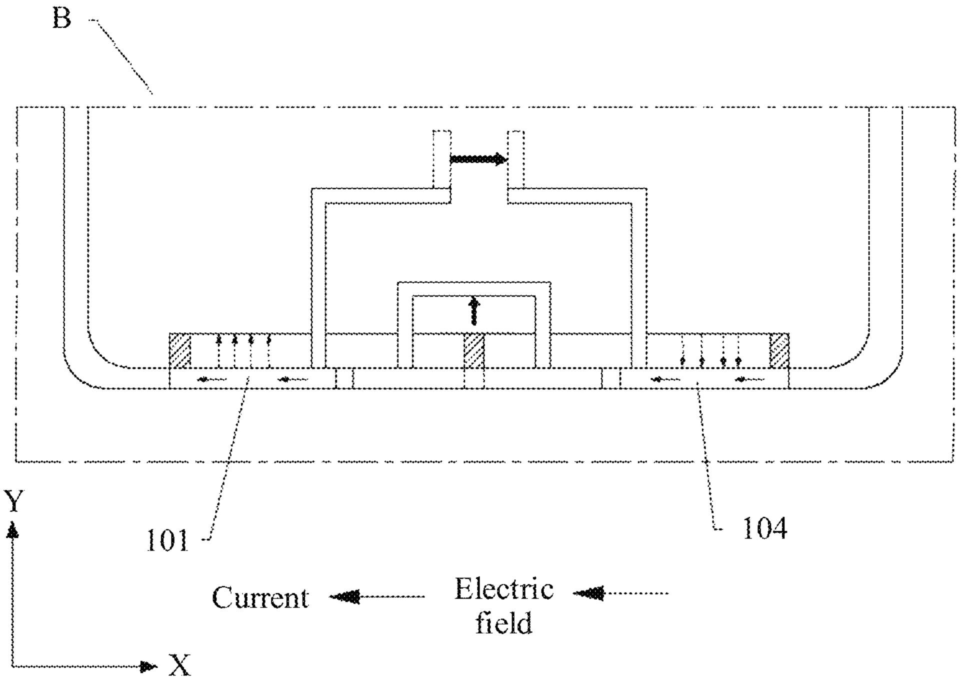
FIG. 21*a* is a schematic diagram of flow directions of a current and an electric field of the antenna structure shown in FIG. 17 under a signal with a frequency of 1.75 GHz.
Figure 21B:
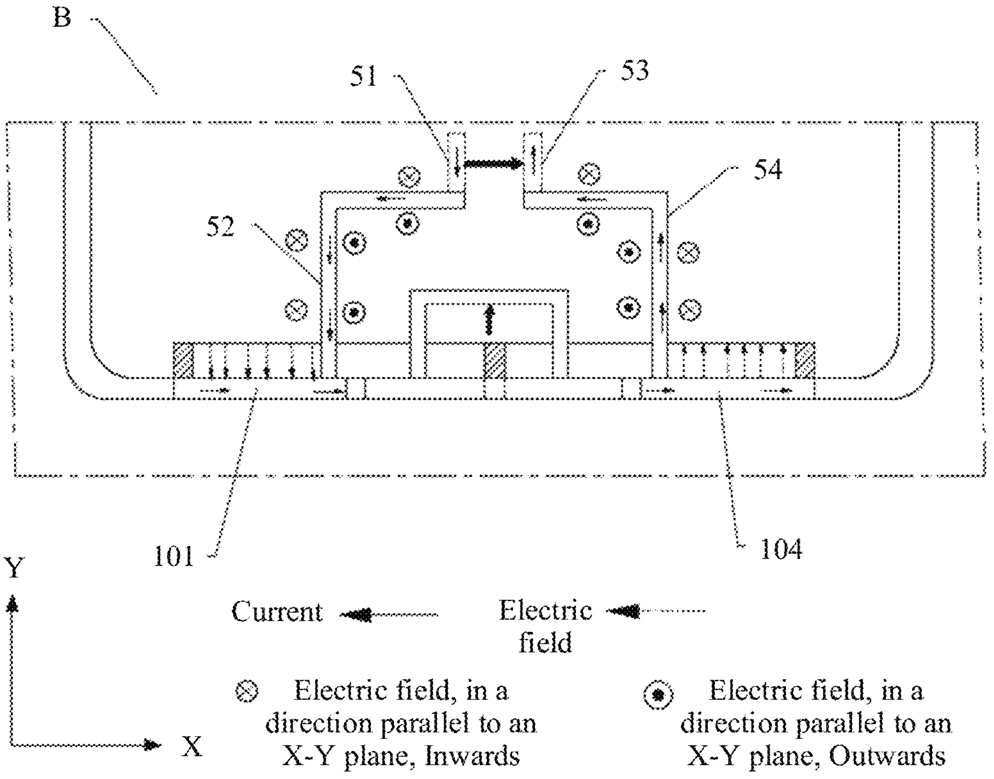
FIG. 21*b* is a schematic diagram of flow directions of another current and electric field of the antenna structure shown in FIG. 17 under a signal with a frequency of 2.36 GHz.
Figure 21C:
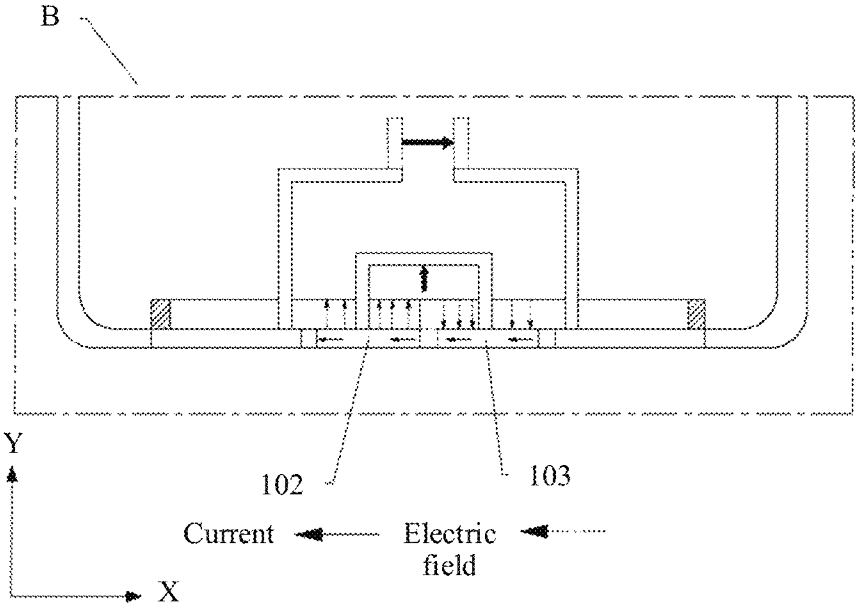
FIG. 21*c* is a schematic diagram of flow directions of further another current and electric field of the antenna structure shown in FIG. 17 under a signal with a frequency of 2.79 GHz.
Figure 21D:
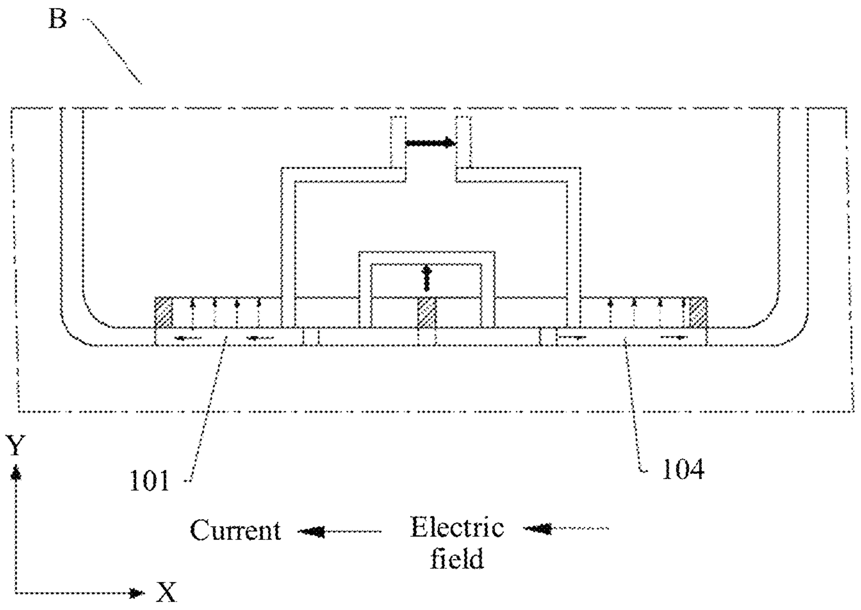
FIG. 21*d* is a schematic diagram of flow directions of still another current and electric field of the antenna structure shown in FIG. 17 under a signal with a frequency of 1.87 GHz.
Figure 21E:
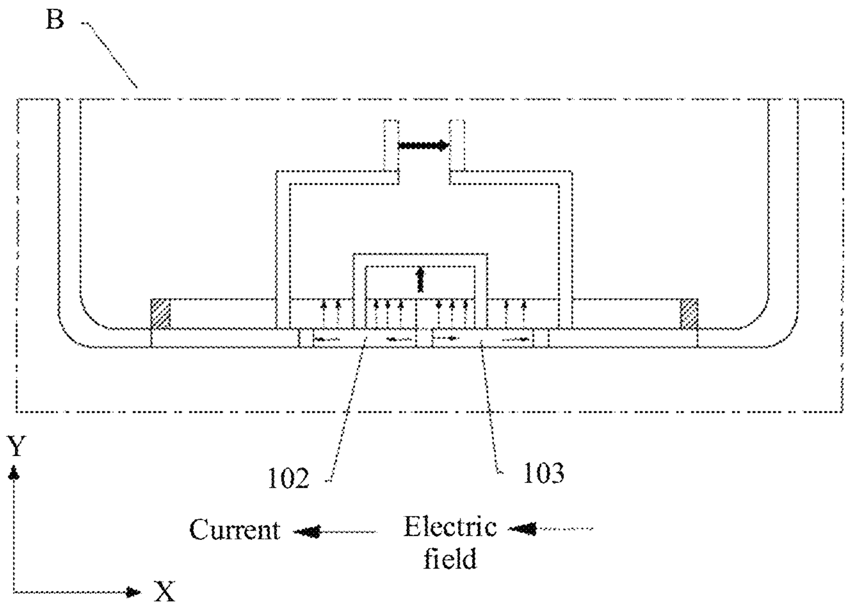
FIG. 21*e* is a schematic diagram of flow directions of further still another current and electric field of the antenna structure shown in FIG. 17 under a signal with a frequency of 2.36 GHz.
Figure 21F:
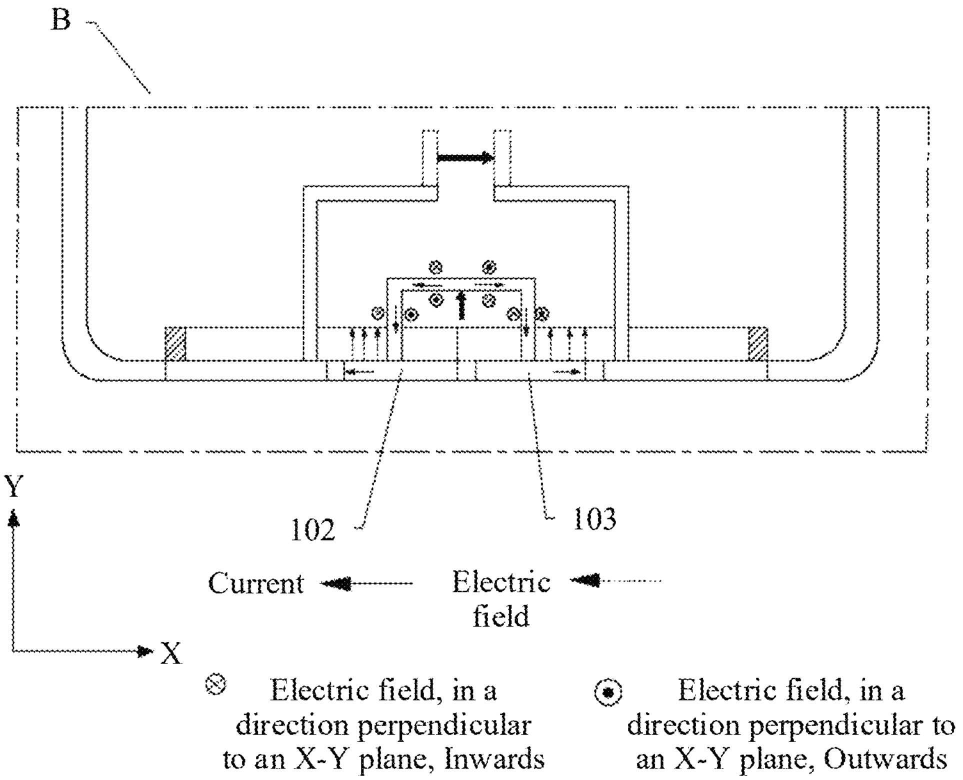
FIG. 21*f* is a schematic diagram of flow directions of further still another current and electric field of the antenna structure shown in FIG. 17 under a signal with a frequency of 2.87 GHz.

With reference to FIG. 21*a* to FIG. 21*f*, the following specifically describes schematic diagrams of flow directions of a current and an electric field of an antenna structure at six resonance frequencies. FIG. 21*a* is a schematic diagram of flow directions of a current and an electric field of the antenna structure shown in FIG. 17 under a signal with a frequency of 1.75 GHz. FIG. 21*b* is a schematic diagram of flow directions of another current and electric field of the antenna structure shown in FIG. 17 under a signal with a frequency of 2.36 GHz. FIG. 21*c* is a schematic diagram of flow directions of further another current and electric field of the antenna structure shown in FIG. 17 under a signal with a frequency of 2.79 GHz. FIG. 21*d* is a schematic diagram of flow directions of still another current and electric field of the antenna structure shown in FIG. 17 under a signal with a frequency of 1.87 GHz. FIG. 21*e* is a schematic diagram of flow directions of still yet another current and electric field of the antenna structure shown in FIG. 17 under a signal with a frequency of 2.36 GHz. FIG. 21*f* is a schematic diagram of flow directions of further still another current and electric field of the antenna structure shown in FIG. 17 under a signal with a frequency of 2.87 GHz.

Refer to FIG. 21*a*. A first-type current is generated in the antenna structure. A current flow direction of the first-type current has two portions: One portion is a current that is transmitted from the open end of the first radiator 101 to the ground end of the first radiator 101. The other portion is a current that is transmitted from the ground end of the fourth radiator 104 to the open end of the fourth radiator 104. In addition, directions of electric fields on respective sides of the first radiator 101 and the fourth radiator 104 are different.

Refer to FIG. 21*b*. A second-type current is generated in the antenna structure. A current flow direction of the second-type current has three portions: One portion is a current that flows along the open end of the fourth radiator 104, the fourth conductive segment 54, the second conductive segment 53, the first conductive segment 51, the third conductive segment 52, and the open end of the first radiator 101. The other portion is a current that flows from the ground end of the first radiator 101 to the open end of the first radiator 101. Still another portion is a current that flows from the open end of the fourth radiator 104 to the ground end of the fourth radiator 104. In addition, directions of electric fields on respective sides of the first radiator 101 and the fourth radiator 104 are different. In addition, directions of electric fields on two sides of the first conductive segment 51 and the third conductive segment 52 are also opposite. Directions of electric fields on two sides of the fourth conductive segment 54 and the second conductive segment 53 are also opposite.

Refer to FIG. 21*c*. A third-type current is generated in the antenna structure. A current flow direction of the third-type current is a flow along the open end of the third radiator 103, the ground end of the second radiator 102, and the open end of the second radiator 102. In addition, directions of electric fields on respective sides of the third radiator 103 and the second radiator 102 are different.

Refer to FIG. 21*d*. A fourth-type current is generated in the antenna structure. A current flow direction of the fourth-type current has two portions: One portion is a current that is transmitted from the open end of the first radiator 101 to the ground end of the first radiator 101. The other portion is a current that is transmitted from the open end of the fourth radiator 104 to the ground end of the fourth radiator 104. Directions of electric fields on respective sides of the first radiator 101 and the fourth radiator 104 are the same.

Refer to FIG. 21*e*. A fifth-type current is generated in the antenna structure. A current flow direction of the fifth-type current has two portions. A first portion is a current that is transmitted from the ground end of the second radiator 102 to the open end of the second radiator 102. A second portion is a current that is transmitted from the ground end of the third radiator 103 to the open end of the third radiator 103. In addition, directions of electric fields on respective sides of the third radiator 103 and the second radiator 102 are the same. It may be understood that, a 2.36 GHz resonance mode mainly functions through the second radiator 102 and the third radiator 103.

Refer to FIG. 21*f* A sixth-type current is generated in the antenna structure. The specific flow direction includes four portions. A first portion is a current that flows from a left portion of the feed end of the bridge structure 41 to the feed end. The second portion is a current that flows from a right portion of the feed end of the bridge structure 41 to the feed end. The third portion is a current that flows from the bridge structure 41 to the open end of the second radiator 102. The fourth portion is a current that flows from the bridge structure 41 to the open end of the third radiator 103. In addition, directions of electric fields on respective sides of the third radiator 103 and the second radiator 102 are the same. It may be understood that, a 2.87 GHz resonance mode further functions through the bridge structure 41 in a symmetric feed manner in addition to the second radiator 102 and the third radiator 103.

Figure 21G:
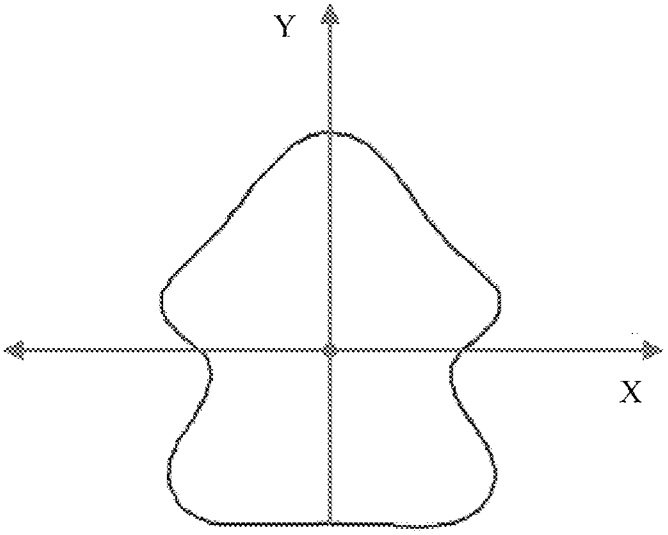
FIG. 21*g* is a schematic diagram of a radiation direction of the antenna structure shown in FIG. 17 under a signal with a frequency of 1.75 GHz.
Figure 21H:
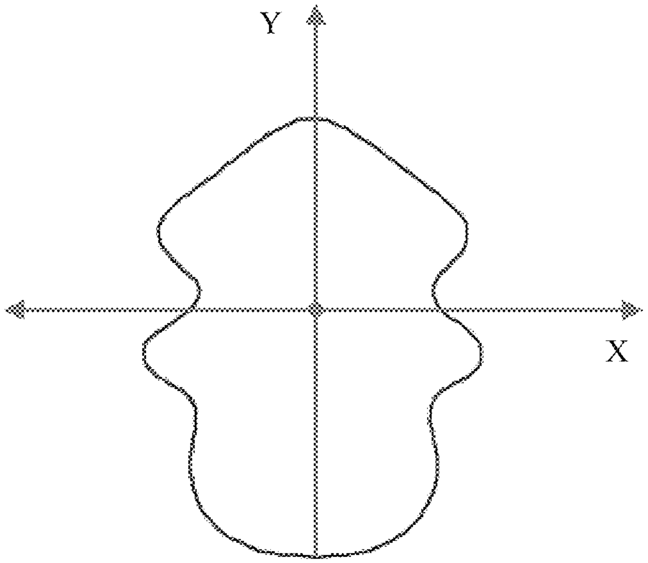
FIG. 21*h* is a schematic diagram of another radiation direction of the antenna structure shown in FIG. 17 under a signal with a frequency of 2.36 GHz.
Figure 21I:
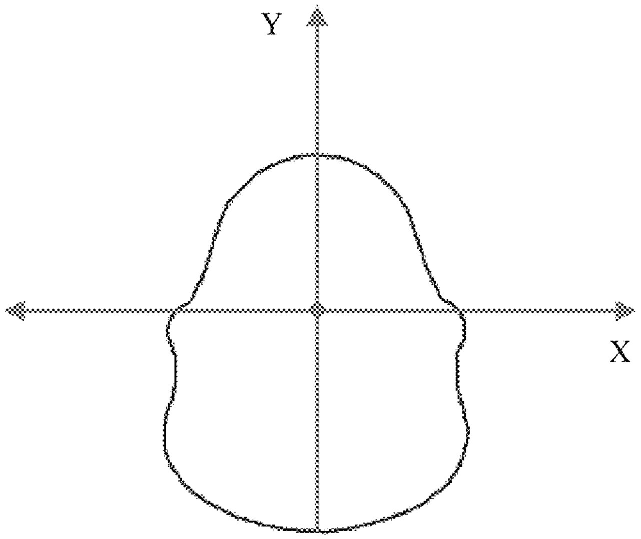
FIG. 21*i* is a schematic diagram of still another radiation direction of the antenna structure shown in FIG. 17 under a signal with a frequency of 2.79 GHz.
Figure 21J:
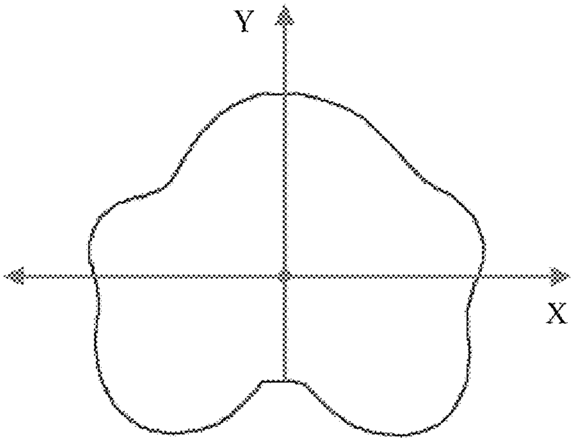
FIG. 21*j* is a schematic diagram of yet another radiation direction of the antenna structure shown in FIG. 17 under a signal with a frequency of 1.87 GHz.
Figure 21K:
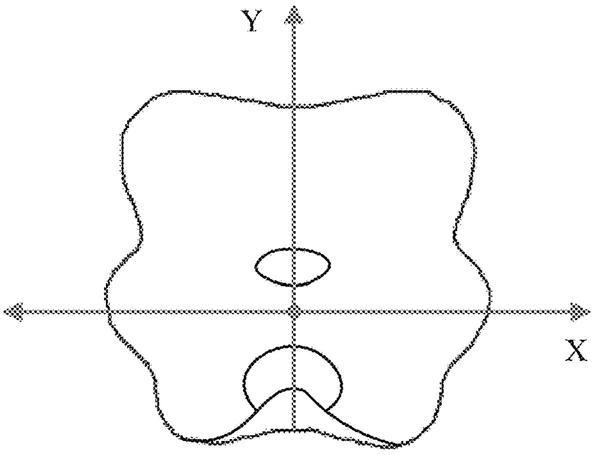
FIG. 21*k* is a schematic diagram of still yet another radiation direction of the antenna structure shown in FIG. 17 under a signal with a frequency of 2.36 GHz.
Figure 21L:
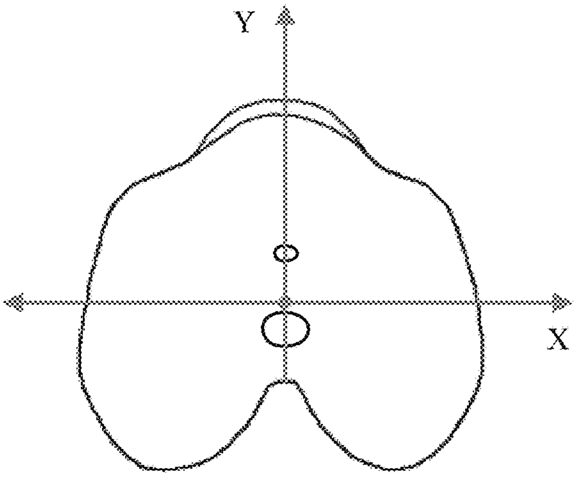
FIG. 21*l* is a schematic diagram of a further still another radiation direction of the antenna structure shown in FIG. 17 under a signal with a frequency of 2.87 GHz.

The following specifically describes schematic diagrams of radiation directions of an antenna structure at five resonance frequencies with reference to FIG. 21*g* to FIG. 21*l*. FIG. 21*g* is a schematic diagram of a radiation direction of the antenna structure shown in FIG. 17 under a signal with a frequency of 1.75 GHz. FIG. 21*h* is a schematic diagram of another radiation direction of the antenna structure shown in FIG. 17 under a signal with a frequency of 2.36 GHz. FIG. 21*i* is a schematic diagram of still another radiation direction of the antenna structure shown in FIG. 17 under a signal with a frequency of 2.79 GHz. FIG. 21*j* is a schematic diagram of yet another radiation direction of the antenna structure shown in FIG. 17 under a signal with a frequency of 1.87 GHz. FIG. 21*k* is a schematic diagram of still yet another radiation direction of the antenna structure shown in FIG. 17 under a signal with a frequency of 2.36 GHz. FIG. 21*l* is a schematic diagram of further still another radiation direction of the antenna structure shown in FIG. 17 under a signal with a frequency of 2.87 GHz.

Refer to FIG. 21*g* to FIG. 21*i*. An antenna signal generated by the antenna structure in FIG. 21*g* to FIG. 21*i* in an anti-symmetric feed manner has strong radiation intensity in a radiation direction as a Y-axis direction, and has weak radiation intensity in a radiation direction as an X-axis direction. To be specific, a common mode slot antenna with a frequency of 1.75 GHz has strong radiation in the Y-axis direction, a common mode slot antenna with a frequency of 2.36 GHz has strong radiation in the Y-axis direction, and a differential mode wire antenna with a frequency of 2.79 GHz has strong radiation in the Y-axis direction.

Refer to FIG. 21*j* to FIG. 21*l*. An antenna signal generated by the antenna structure in FIG. 21*j* to FIG. 21*l* in an anti-symmetric feed manner has strong radiation intensity in a radiation direction as a Y-axis direction, and has weak radiation intensity in a radiation direction as an X-axis direction. To be specific, a differential mode slot antenna with a frequency of 1.87 GHz has strong radiation intensity in the X-axis direction, a common mode wire antenna with a frequency of 2.36 GHz has strong radiation intensity in the X-axis direction, and a common mode wire antenna with a frequency of 2.87 GHz has strong radiation intensity in the X-axis direction.

In addition, it can be learned from FIG. 13*f* to FIG. 13*j* that in a same frequency band (for example, 0 GHz to 3 GHz in this embodiment), an excitation resonance signal generated by the antenna structure in the anti-symmetric feed manner differs greatly from an excitation resonance signal generated by the antenna structure in the symmetric feed manner in terms of directions. In this case, a radiation range of the antenna structure is wide.

In addition, it can be calculated, based on radiation patterns of two antennas in FIG. 21*g* to FIG. 21*l*, that ECCs of antenna signals generated in the anti-symmetric feed manner and antenna signals generated in the symmetric feed manner are both less than 0.1. In other words, the ECC of the antenna structure in this embodiment is small.

In this embodiment, an antenna structure including the slot antenna 40 and the wire antenna 50 is disposed, and two feed manners are used, so that the antenna structure is excited to generate six resonance modes, that is, generate six resonance frequencies. This implements that an antenna covers a plurality of frequency bands.

In addition, isolation between an excitation resonance signal generated by the antenna structure in the anti-symmetric feed manner and an excitation resonance signal generated by the antenna structure in the symmetric feed manner may reach more than 22 dB, so that antenna performance of the antenna structure is good.

Figure 22:
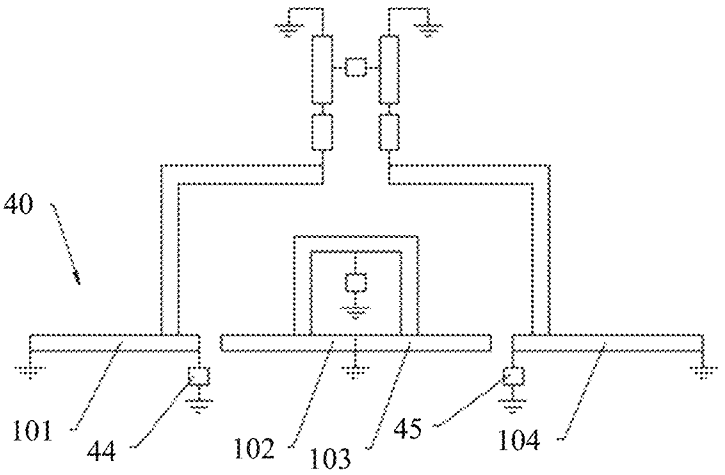
FIG. 22 is a schematic diagram of another embodiment of an antenna structure of the electronic device shown in FIG. 16.

In Extended Embodiment 1, technical content that is the same as that in the second embodiment is not described again. FIG. 22 is a schematic diagram of another embodiment of an antenna structure of the electronic device shown in FIG. 16. The slot antenna 40 further includes a first tuning circuit 44 and a second tuning circuit 45. One portion of the first tuning circuit 44 is connected to an end portion that is of the first radiator 101 and that faces the second radiator 102, and the other portion is grounded. In other words, the open end of the first radiator 101 is grounded through the first tuning circuit 44. The first tuning circuit 44 is configured to adjust an electrical length of the first radiator 101. One portion of the second tuning circuit 45 is connected to an end portion that is of the fourth radiator 104 and that faces the third radiator 103, and the other portion is grounded. In other words, the open end of the fourth radiator 104 is grounded through the second tuning circuit 45. For example, the first tuning circuit 44 is a capacitor. The second tuning circuit 45 is also a capacitor. In this case, the electrical length of the first radiator 101 and the electrical length of the fourth radiator 104 may be effectively adjusted by setting an operating parameter of the capacitor, so that when the electrical length of the first radiator 101 and the electrical length of the fourth radiator 104 are reduced, the slot antenna 40 may be miniaturized.

In Extended Embodiment 2, technical content that is the same as that in the second embodiment is not described again: The bezel 12 is made of an insulation material. In this case, the first short bezel 123 is also made of an insulation material. In this case, the first metal segment 1231, the first insulation segment 1232, the second metal segment 1233, the second insulation segment 1234, and the third metal segment 1235 that are successively connected are formed on an inner side of the first short bezel 123. Structural forms of the first metal segment 1231, the second metal segment 1233, and the third metal segment 1235 may be a flexible circuit board, a laser direct structuring (LDS) metal, an in-mold injection molding metal, or a printed circuit board cabling. In addition, the first insulation segment 1232 and the second insulation segment 1234 may be formed by filling an insulation material. For example, the insulation material is a material such as polymer, glass, or ceramic, or a combination of these materials. In another embodiment, the first insulation segment 1237 and the second insulation segment 1234 may be gaps, that is, the gaps are not filled with an insulation material.

In a third embodiment, technical content that is the same as that in the first embodiment and the second embodiment is not described again. In this embodiment, an antenna structure formed by two slot antennas (a first slot antenna and a second slot antenna) is disposed, and two feed manners are used, so that the antenna structure is excited to generate a plurality of resonance modes. This implements that an antenna may cover a plurality of frequency bands.

Figure 23A:
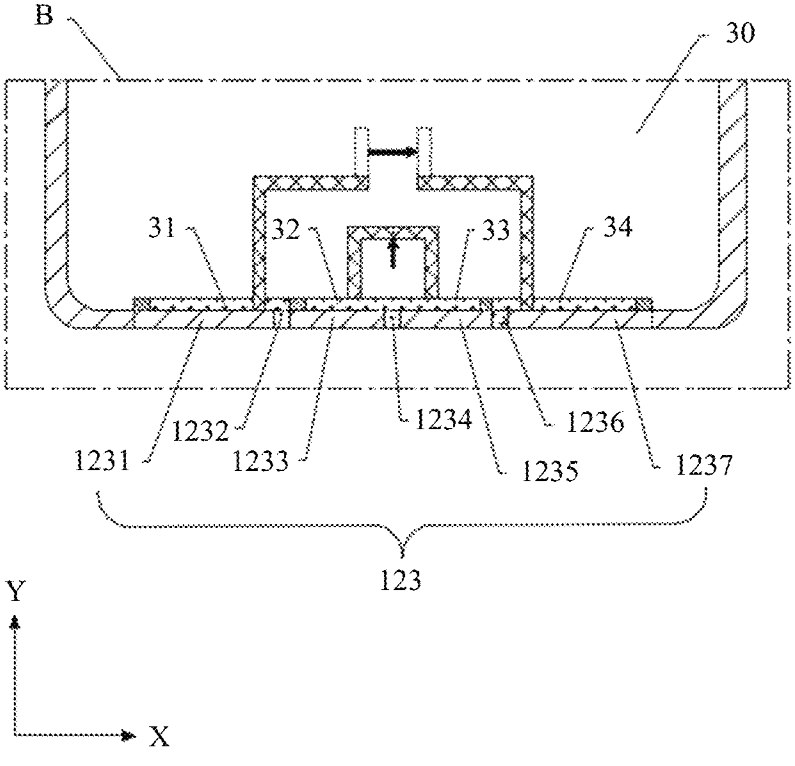
FIG. 23*a* is an enlarged schematic diagram of another embodiment at B of the electronic device shown in FIG. 7.
Figure 23B:
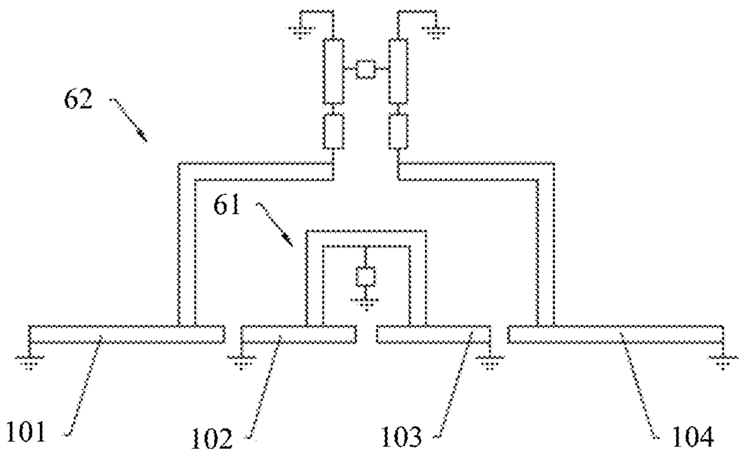
FIG. 23*b* is a schematic diagram of an antenna structure of the electronic device shown in FIG. 23*a;*

Refer to FIG. 23*a* and FIG. 23*b*. FIG. 23*a* is an enlarged schematic diagram of another embodiment at B of the electronic device shown in FIG. 7. FIG. 23*b* is a schematic diagram of an antenna structure of the electronic device shown in FIG. 23*a*. FIG. 23*b* is a schematic diagram of the antenna structure shown in FIG. 23*a*. This embodiment is described by using an example in which a radiator of an antenna structure including two slot antennas is a portion of the first short bezel 123. In another embodiment, a radiator of an antenna structure including two slot antennas may alternatively be a portion of the first long bezel 121, a portion of the second long bezel 122, or a portion of the second short bezel 124.

Specifically, the two slot antennas are a first slot antenna 61 and a second slot antenna 62.

First, the first short bezel 123 is successively connected to the first metal segment 1231, the first insulation segment 1232, the second metal segment 1233, the second insulation segment 1234, the third metal segment 1235, the third insulation segment 1236, and the fourth metal segment 1237. In other words, the first insulation segment 1232 is located between the first metal segment 1231 and the second metal segment 1233. The second insulation segment 1234 is located between the second metal segment 1233 and the third metal segment 1235. The third insulation segment 1236 is located between the third metal segment 1235 and the fourth metal segment 1237. It may be understood that a fifth gap is formed between the first metal segment 1231 and the second metal segment 1233. The first insulation segment 1232 may be formed by filling the fifth gap with an insulation material. For example, the insulation material may be a material such as polymer, glass, or ceramic, or a combination of these materials. In another embodiment, the fifth gap may be filled with air, that is, the fifth gap is not filled with any insulation material. For a disposition manner of the second insulation segment 1234 and the third insulation segment 1236, refer to the disposition manner of the first insulation segment 1232. Details are not described herein.

In addition, an end portion that is of the first metal segment 1231 and that is away from the first insulation segment 1232 is grounded. For a grounding manner of the first metal segment 1231 in this embodiment, refer to the grounding manner of the first ground portion 2 in the first embodiment, and details are not described herein again. An end portion that is of the second metal segment 1233 and that is close to the first insulation segment 1232 is grounded. An end portion that is of the third metal segment 1235 and that is close to the third insulation segment 1236 is grounded. An end portion that is of the fourth metal segment 1237 and that is away from the third insulation segment 1236 is grounded. For a grounding manner of the second metal segment 1233, a grounding manner of the third metal segment 1235, and a grounding manner of the fourth metal segment 1237 in this embodiment, refer to the grounding manner of the first ground portion 2 in the first embodiment, and details are not described herein again.

In addition, a first gap 31 is disposed between the first metal segment 1231 and the ground plane of the circuit board 30. In an embodiment, the first gap 31 may be filled with an insulation material. For example, the first gap 31 may be filled with a material such as polymer, glass, or ceramic, or a combination of these materials. The insulation material is connected to the first insulation segment 1232, the second insulation segment 1234, and the third insulation segment 1236. In another embodiment, the first gap 31 may be filled with air, that is, the first gap 31 is not filled with any insulation material.

In addition, a second gap 32 is disposed between the second metal segment 1233 and the ground plane of the circuit board 30. The second gap 32 is connected to the first gap 31. For a disposition manner of the second gap 32, refer to the disposition manner of the first gap 31. Details are not described herein.

In addition, a third gap 33 is disposed between the third metal segment 1235 and the ground plane of the circuit board 30. The third gap 33 is connected to the first gap 31 and the second gap 32. For a disposition manner of the third gap 33, refer to the disposition manner of the first gap 31. Details are not described herein.

In addition, a fourth gap 34 is disposed between the third metal segment 1235 and the ground plane of the circuit board 30. The fourth gap 34 is connected to the first gap 31, the second gap 32, and the third gap 33. For a disposition manner of the fourth gap 34, refer to the disposition manner of the first gap 31. Details are not described herein.

In this way, the first metal segment 1231 forms the first radiator 101. The second metal segment 1233 forms the second radiator 102. The third metal segment 1235 forms the third radiator 103. The fourth metal segment 1237 forms the fourth radiator 104.

In addition, the second radiator 102 and the third radiator 103 form a radiator of the first slot antenna 61.

In addition, the first radiator 101 and the fourth radiator 104 form a radiator of the second slot antenna 62.

Second, for a feed manner of the first slot antenna 61 in this embodiment, refer to the feed manner of the slot antenna 40 in the first embodiment. Details are not described herein.

In addition, for a feed manner of the second slot antenna 62 in this embodiment, refer to the feed manner of the wire antenna 50 in the first embodiment. Details are not described herein.

It may be understood that, in this embodiment, an antenna structure including two slot antennas is excited to generate a plurality of resonance modes, so that an antenna may cover a plurality of frequency bands.

In a fourth embodiment, technical content that is the same as that in the first embodiment and the second embodiment is not described again. An antenna structure including two wire antennas is disposed, and two feed manners are used, so that the antenna structure is excited to generate a plurality of resonance modes. This implements that an antenna may cover a plurality of frequency bands.

Figure 24A:
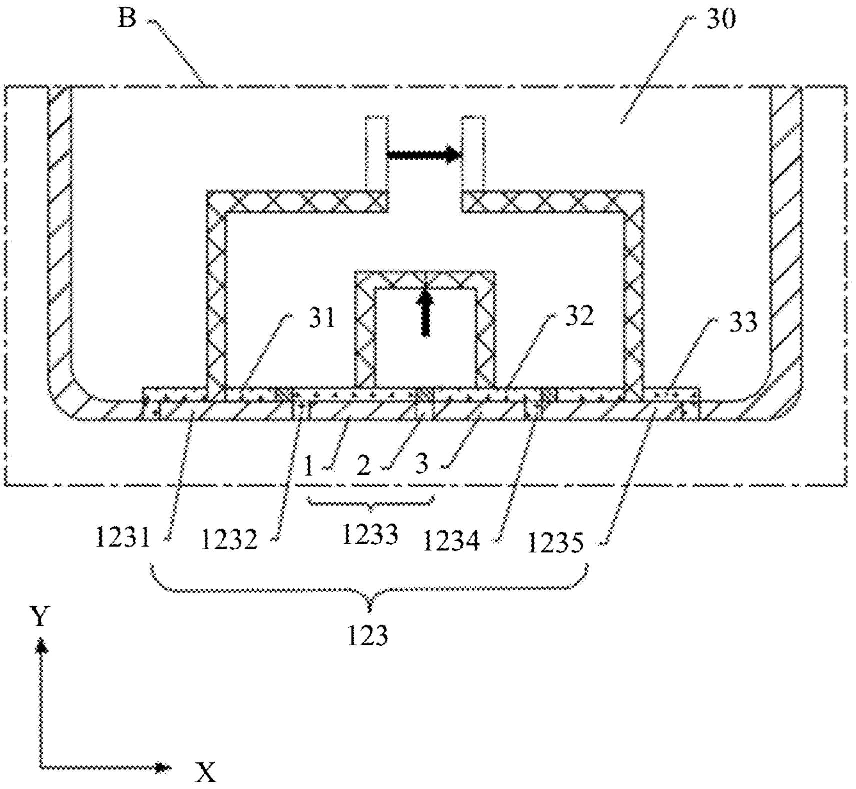
FIG. 24*a* is an enlarged schematic diagram of further another embodiment at B of the electronic device shown in FIG. 7.
Figure 24B:
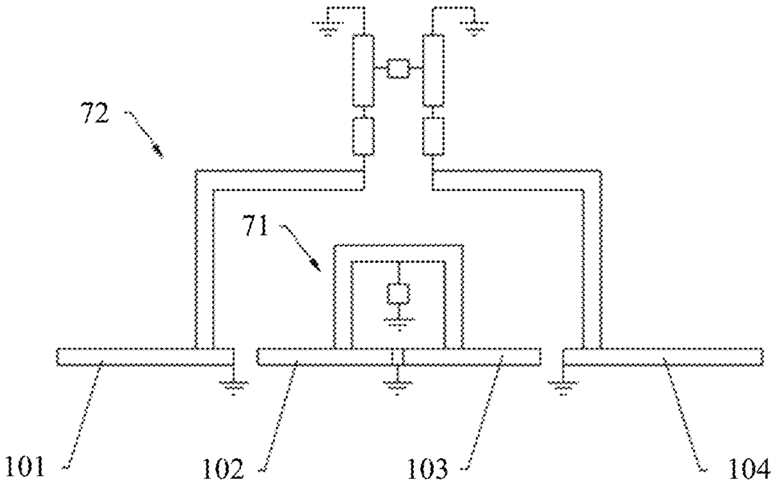
FIG. 24*b* is a schematic diagram of an antenna structure of the electronic device shown in FIG. 24*a;*

Refer to FIG. 24*a* and FIG. 24*b*. FIG. 24*a* is an enlarged schematic diagram of further another embodiment at B of the electronic device shown in FIG. 7. FIG. 24*b* is a schematic diagram of an antenna structure of the electronic device shown in FIG. 24*a*. An example in which a radiator of an antenna structure including two wire antennas is a portion of the first short bezel 123 is used for description. In another embodiment, a radiator of an antenna structure including two wire antennas may alternatively be a portion of the first long bezel 121, a portion of the second long bezel 122, or a portion of the second short bezel 124.

Specifically, the two wire antennas are a first wire antenna 71 and a second wire antenna 72.

The first short bezel 123 includes a first metal segment 1231, a first insulation segment 1232, a second metal segment 1233, a second insulation segment 1234, and a third metal segment 1235 that are successively connected. In other words, the first insulation segment 1232 is located between the first metal segment 1231 and the second metal segment 1233. The second insulation segment 1234 is located between the second metal segment 1233 and the third metal segment 1235.

In addition, the second metal segment 1233 includes a first portion 1, a first ground portion 2, and a second portion 3. The first portion 1 is connected to the first insulation segment 1232. The second portion 3 is connected to the second insulation segment 1234. It may be understood that a fourth gap is formed between the first metal segment 1231 and the first portion 1. The first insulation segment 1232 may be formed by filling the fourth gap with an insulation material. For example, the insulation material may be a material such as polymer, glass, or ceramic, or a combination of these materials. In another embodiment, the fourth gap may be filled with air, that is, the fourth gap is not filled with any insulation material. In addition, a fifth gap is formed between the second portion 3 and the third metal segment 1235. The second insulation segment 1234 may be formed by filling the fifth gap with an insulation material. For example, the insulation material may be a material such as polymer, glass, or ceramic, or a combination of these materials.

In addition, for a grounding manner of the first ground portion 2 in this embodiment, refer to the grounding manner of the first ground portion 2 in the first embodiment, and details are not described herein again. In addition, an end portion that is of the first metal segment 1231 and that is close to the first insulation segment 1232 is grounded. An end portion that is of the third metal segment 1235 and that is close to the second insulation segment 1234 is grounded. For a grounding manner of the first metal segment 1231 and a grounding manner of the third metal segment 1235, refer to the grounding manner of the first ground portion 2 in the first embodiment, and details are not described herein again.

In addition, a first gap 31 is disposed between the first metal segment 1231 and the circuit board 30. In an embodiment, the first gap 31 may be filled with an insulation material. For example, the first gap 31 may be filled with a material such as polymer, glass, or ceramic, or a combination of these materials. The insulation material is connected to the first insulation segment 1232. In another embodiment, the first gap 31 may be filled with air, that is, the first gap 31 is not filled with any insulation material.

In addition, a second gap 32 is disposed between the second metal segment 1233 and the circuit board 30. The second gap 32 is connected to the first gap 31. For a disposition manner of the second gap 32, refer to the disposition manner of the first gap 31. Details are not described herein.

In addition, a third gap 33 is disposed between the third metal segment 1235 and the circuit board 30. The third gap 33 is connected to the first gap 31 and the second gap 32. For a disposition manner of the third gap 33, refer to the disposition manner of the first gap 31. Details are not described herein.

In this way, the first portion 1 and the first ground portion 2 form the second radiator 102. The second portion 3 and the first ground portion 2 form the third radiator 103. The second radiator 102 and the third radiator 103 form a radiator of the first wire antenna 71.

In addition, the first metal segment 1231 forms the first radiator 101. The third metal segment 1235 forms the fourth radiator 104. The first radiator 101 and the fourth radiator 104 form a radiator of the second wire antenna 72.

Second, for a feed manner of the first wire antenna 71 in this embodiment, refer to the feed manner of the slot antenna 40 in the first embodiment. Details are not described herein.

In addition, for a feed manner of the second wire antenna 72 in this embodiment, refer to the feed manner of the wire antenna 50 in the first embodiment. Details are not described herein.

It may be understood that, in this embodiment, an antenna structure including two wire antennas may be excited to generate a plurality of resonance modes, so that an antenna may cover a plurality of frequency bands.

In a fifth embodiment, technical content that is the same as that in the first embodiment and the second embodiment is not described again: An antenna structure including a loop antenna and a slot antenna is disposed, and two feed manners are used, so that the antenna structure is excited to generate a plurality of resonance modes. This implements that an antenna may cover a plurality of frequency bands.

Figure 25A:
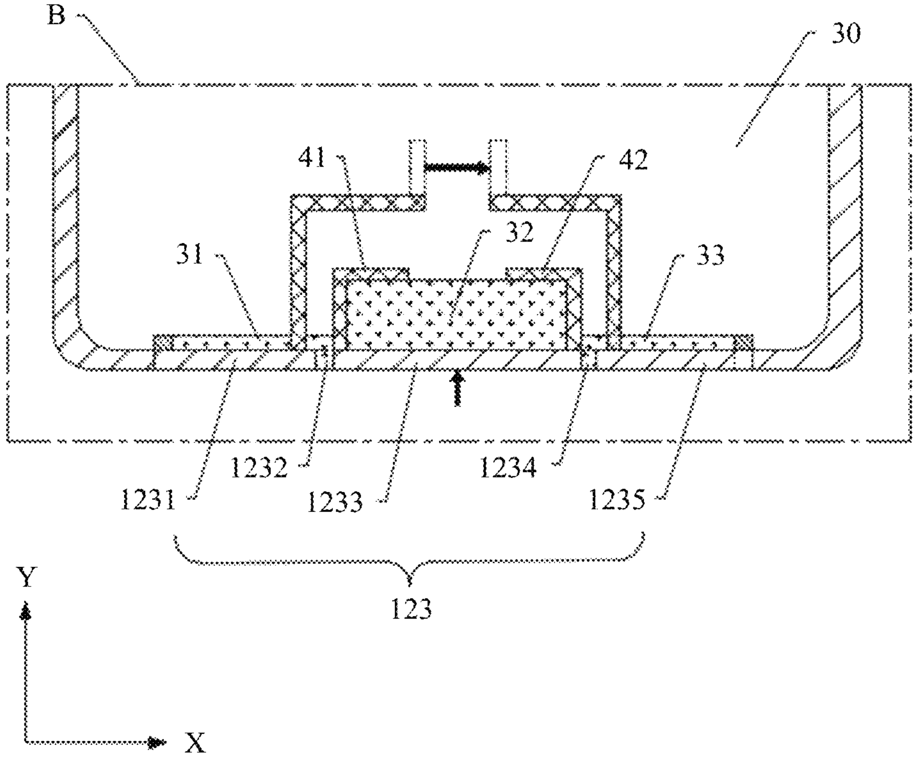
FIG. 25*a* is an enlarged schematic diagram of still another embodiment at B of the electronic device shown in FIG. 7.
Figure 25B:
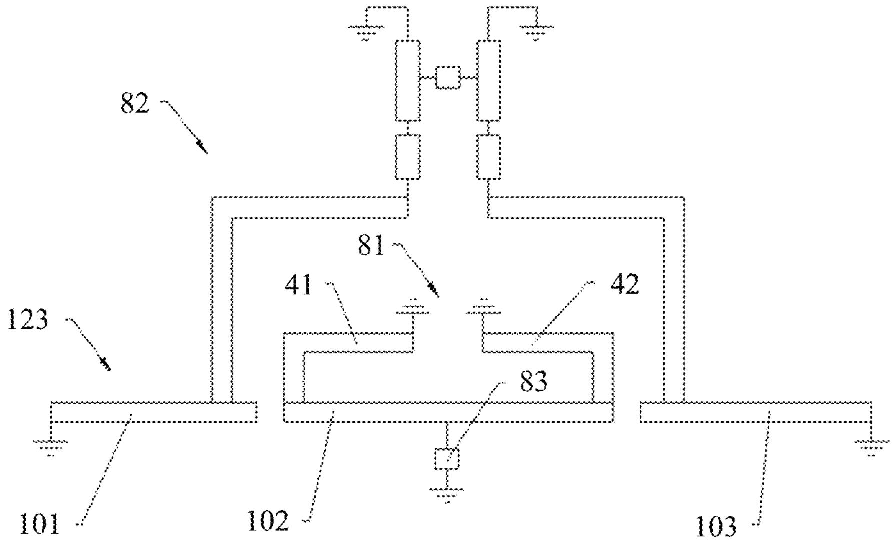
FIG. 25*b* is a schematic diagram of an antenna structure of the electronic device shown in FIG. 25*a*.

Refer to FIG. 25*a* and FIG. 25*b*. FIG. 25*a* is an enlarged schematic diagram of still another embodiment at B of the electronic device shown in FIG. 7. FIG. 25*b* is a schematic diagram of an antenna structure of the electronic device shown in FIG. 25*a*. An example in which a radiator of the antenna structure in this embodiment is a portion of the first short bezel 123 is used for description. In another embodiment, a radiator of the antenna structure may alternatively be a portion of the first long bezel 121, a portion of the second long bezel 122, or a portion of the second short bezel 124.

Antennas of the electronic device 100 include a loop antenna 81 and a slot antenna 82.

In an X-axis direction, the first short bezel 123 includes a first metal segment 1231, a first insulation segment 1232, a second metal segment 1233, a second insulation segment 1234, and a third metal segment 1235 that are successively connected. In other words, the first insulation segment 1232 is located between the first metal segment 1231 and the second metal segment 1233. The second insulation segment 1234 is located between the second metal segment 1233 and the third metal segment 1235. It may be understood that a fourth gap is formed between the first metal segment 1231 and the second metal segment 1233. The first insulation segment 1232 may be formed by filling the fourth gap with an insulation material. For example, the insulation material may be a material such as polymer, glass, or ceramic, or a combination of these materials. In another embodiment, the fourth gap may be filled with air, that is, the fourth gap is not filled with any insulation material. For a disposition manner of the second insulation segment 1234, refer to the disposition manner of the first insulation segment 1232.

In addition, an end portion that is of the first metal segment 1231 and that is away from the first insulation segment 1232 is grounded. An end portion that is of the third metal segment 1235 and that is away from the second insulation segment 1234 is grounded. For a grounding manner of the first metal segment 1231 and a grounding manner of the third metal segment 1235, refer to the grounding manner of the first ground portion 2 in the first embodiment, and details are not described herein again.

In addition, an end portion that is of the second metal segment 1233 and that is connected to the first insulation segment 1232 is grounded. An end portion that is of the second metal segment 1233 and that is connected to the second insulation segment 1234 is grounded.

Specifically, the antenna structure further includes a third conductive segment 41 and a fourth conductive segment 42. The third conductive segment 41 and the fourth conductive segment 42 are located within the bezel 12. One end of the third conductive segment 41 is connected to an end portion that is of the second metal segment 1233 and that is connected to the first insulation segment 1232. The other end is grounded. One end of the fourth conductive segment 42 is connected to an end portion that is of the second metal segment 1233 and that is connected to the second insulation segment 1234, and the other end is grounded. In other words, the end portion that is of the second metal segment 1233 and that is connected to the first insulation segment 1232 is grounded through the third conductive segment 41. An end portion that is of the second metal segment 1233 and that is connected to the second insulation segment 1234 is grounded through the fourth conductive segment 42.

For a grounding manner of the third conductive segment 41 and a grounding manner of the fourth conductive segment 42, refer to the grounding manner of the first ground portion 2 in the first embodiment. Details are not described herein.

In addition, a first gap 31 is disposed between the second metal segment 1233 and the circuit board 30. In an embodiment in which the first gap 31 is connected, the first gap 31 may be filled with an insulation material. For example, the first gap 31 may be filled with a material such as polymer, glass, or ceramic, or a combination of these materials. The insulation material is connected to the first insulation segment 1233. In another embodiment, the first gap 31 may be filled with air, that is, the first gap 31 is not filled with any insulation material.

In addition, a second gap 32 is disposed between the first metal segment 1231 and the circuit board 30. The second gap 32 is connected to the first gap 31. For a disposition manner of the second gap 32, refer to the disposition manner of the first gap 31. Details are not described herein.

In addition, a third gap 33 is disposed between the third metal segment 1235 and the circuit board 30. The third gap 33 is connected to the first gap 31 and the second gap 32. For a disposition manner of the third gap 33, refer to the disposition manner of the first gap 31. Details are not described herein.

In this way, the first metal segment 1231 forms the first radiator 101. The second metal segment 1233 forms the second radiator 102. The third metal segment 1235 forms the third radiator 103. The second radiator 102 is a radiator of the loop antenna 81. The first radiator 101 and the third radiator 103 are radiators of the slot antenna 82.

Second, the following describes a feed manner of the loop antenna 81 in detail with reference to related accompanying drawings.

The loop antenna 81 further includes a first feed circuit 83. A negative electrode of the first feed circuit 83 is electrically grounded. A positive electrode of the first feed circuit 83 is electrically connected to the second radiator 102.

In addition, for a feed manner of the slot antenna 82 in this embodiment, refer to the feed manner of the wire antenna 50 in the first embodiment. Details are not described herein.

It may be understood that, in this embodiment, an antenna structure including the loop antenna 81 and the slot antenna 82 may be excited to generate four antenna modes, so that an antenna may cover a plurality of frequency bands.

In this application, antenna structures in five embodiments and two feed manners are described with reference to related accompanying drawings, so that the antenna structure can generate a plurality of resonance modes. This implements that an antenna may cover a large quantity of frequency bands.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An electronic device, comprising a circuit board and an antenna structure, wherein the antenna structure comprises a first metal segment, a second metal segment, a first conductive segment, a second conductive segment, a first feed circuit, and a second feed circuit, a first gap is formed between the first metal segment and a side surface of the circuit board, a second gap is formed between the second metal segment and a side surface of the circuit board, and the second gap extends to the first gap;

in a first direction, the first metal segment comprises a first portion, a first ground portion, and a second portion that are successively connected, the second metal segment comprises a third portion, a second ground portion, and a fourth portion that are successively connected, a third gap is formed between the second portion and the third portion, the third gap extends to the first gap and the second gap, an end portion that is of the first portion and that is opposite to the first ground portion is an open end that is not grounded, and an end portion that is of the fourth portion and that is opposite to the second ground portion is an open end that is not grounded;

a negative electrode of the first feed circuit is grounded, and a positive electrode of the first feed circuit is connected to the second portion of the first metal segment and is connected to the third portion of the second metal segment; and the first conductive segment comprises a first end and a second end, the first end is grounded, the second end is connected to the first portion of the first metal segment, the second conductive segment comprises a third end and a fourth end, the third end is grounded, the fourth end is connected to the fourth portion of the second metal segment, a negative electrode of the second feed circuit is electrically connected between the first end and the second end, and a positive electrode of the second feed circuit is electrically connected between the third end and the fourth end.

2. The electronic device according to claim 1, wherein the antenna structure further comprises a first insulation segment and a second insulation segment, and in the first direction, the first insulation segment is connected to the open end of the first portion, and the second insulation segment is connected to the open end of the fourth portion.

3. The electronic device according to claim 2, wherein the electronic device comprises a bezel, the circuit board, the first feed circuit, and the second feed circuit are all located in a region enclosed by the bezel, the first metal segment, the second metal segment, the first insulation segment, and the second insulation segment are each a portion of the bezel, and the bezel further comprises a third insulation segment filled in the third gap.

4. The electronic device according to claim 1, wherein the antenna structure is configured to generate five resonance modes to expand a frequency band in which the antenna structure radiates or receives a signal.

5. The electronic device according to claim 1, wherein the antenna structure further comprises a bridge structure, one end of the bridge structure is connected to the second portion of the first metal segment, and an other end of the bridge structure is connected to the third portion of the second metal segment, and the positive electrode of the first feed circuit is connected to a middle portion of the bridge structure.

6. The electronic device according to claim 5, wherein the antenna structure further comprises a third conductive segment, a fourth conductive segment, a first matching circuit, and a second matching circuit;

the second end of the first conductive segment is successively connected to the first matching circuit, the third conductive segment, and the first portion; and the fourth end of the second conductive segment is successively connected to the second matching circuit, the fourth conductive segment, and the fourth portion.

7. The electronic device according to claim 6, wherein the first conductive segment and the second conductive segment are two symmetrical parallel conducting wires extending from a ground plane in the circuit board.

8. The electronic device according to claim 6, wherein a width direction of the electronic device is an X direction, a length direction of the electronic device is a Y direction, a thickness direction of the electronic device is a Z direction, and in the Z direction, there is a height difference between the first conductive segment and the third conductive segment, and between the second conductive segment and the fourth conductive segment.

9. The electronic device of claim 1, wherein the first conductive segment is different than the first metal segment and the second conductive segment is different than the second metal segment.

10. The electronic device of claim 1, wherein the first conductive segment does not overlap the first metal segment and the second conductive segment does not overlap the second metal segment.

11. An electronic device, comprising a circuit board and an antenna structure, wherein the antenna structure comprises a first metal segment, a second metal segment, a third metal segment, a first conductive segment, a second conductive segment, a first feed circuit, and a second feed circuit, a first gap is formed between the first metal segment and a side surface of the circuit board, a second gap is formed between the second metal segment and a side surface of the circuit board, a third gap is formed between the third metal segment and the side surface of the circuit board, and the first gap, the second gap, and the third gap extend to each other;

in a first direction, the second metal segment comprises a first portion, a first ground portion, and a second portion that are successively connected, a fourth gap is formed between one end of the first metal segment and the first portion, and an other end of the first metal segment is grounded, a fifth gap is formed between one end of the third metal segment and the second portion, and an other end of the third metal segment is grounded, and the fourth gap and the fifth gap extend to the first gap, the second gap, and the third gap;

a negative electrode of the first feed circuit is grounded, and a positive electrode of the first feed circuit is connected to the first portion and the second portion of the second metal segment; and the first conductive segment comprises a first end and a second end, the first end is grounded, the second end is connected to the first metal segment, the second conductive segment comprises a third end and a fourth end, the third end is grounded, the fourth end is connected to the third metal segment, a negative electrode of the second feed circuit is electrically connected between the first end and the second end, and a positive electrode of the second feed circuit is electrically connected between the third end and the fourth end.

12. The electronic device according to claim 11, wherein the antenna structure is configured to generate six resonance modes to expand a frequency band in which the antenna structure radiates or receives a signal.

13. The electronic device according to claim 11, wherein the electronic device comprises a bezel, the circuit board, the first feed circuit, and the second feed circuit are all located in a region enclosed by the bezel, the first metal segment, the second metal segment, and the third metal segment are each a portion of the bezel, and the bezel further comprises a first insulation segment filled in the fourth gap and a second insulation segment filled in the fifth gap.

14. The electronic device according to claim 11, wherein the antenna structure further comprises a bridge structure, one end of the bridge structure is connected to the first portion of the second metal segment, and an other end of the bridge structure is connected to the second portion of the second metal segment, and the positive electrode of the first feed circuit is connected to a middle portion of the bridge structure.

15. The electronic device according to claim 14, wherein the antenna structure further comprises a third conductive segment, a fourth conductive segment, a first matching circuit, and a second matching circuit;

the second end of the first conductive segment is successively connected to the first matching circuit, the third conductive segment, and the first metal segment; and the fourth end of the second conductive segment is successively connected to the second matching circuit, the fourth conductive segment, and the third metal segment.

16. The electronic device according to claim 15, wherein the first conductive segment and the second conductive segment are two symmetrical parallel conducting wires extending from a ground plane in the circuit board.

17. The electronic device according to claim 15, wherein a width direction of the electronic device is an X direction, a length direction of the electronic device is a Y direction, a thickness direction of the electronic device is a Z direction, and in the Z direction, there is a height difference between the first conductive segment and the third conductive segment, and between the second conductive segment and the fourth conductive segment.

* * * * *